(12) United States Patent
Schmitz et al.

(10) Patent No.: US 9,822,844 B2
(45) Date of Patent: Nov. 21, 2017

(54) SHIFTING DEVICE AND GEAR UNIT

(71) Applicant: Pinion GmbH, Stuttgart (DE)

(72) Inventors: Michael Schmitz, Niederelbert (DE); Christoph Lermen, Tholey (DE)

(73) Assignee: Pinion GmbH, Denkendorf (DE)

( * ) Notice: Subject to any disclaimer, the term of this patent is extended or adjusted under 35 U.S.C. 154(b) by 797 days.

(21) Appl. No.: 14/153,751

(22) Filed: Jan. 13, 2014

(65) Prior Publication Data
US 2014/0123793 A1    May 8, 2014

Related U.S. Application Data

(60) Division of application No. 13/525,493, filed on Jun. 18, 2012, now Pat. No. 8,628,447, which is a
(Continued)

(30) Foreign Application Priority Data

Dec. 18, 2009 (DE) ........................ 10 2009 060 484

(51) Int. Cl.
*F16H 3/08* (2006.01)
*F16H 3/083* (2006.01)
(Continued)

(52) U.S. Cl.
CPC ............ *F16H 3/083* (2013.01); *B62M 11/04* (2013.01); *B62M 11/06* (2013.01);
(Continued)

(58) Field of Classification Search
CPC ... F16D 7/00; F16D 7/02; F16D 7/024; F16H 3/08; F16H 3/083; B60M 11/04; B60M 11/06
(Continued)

(56) References Cited

U.S. PATENT DOCUMENTS 2,032,735 A * 3/1936 Blanchard ............... F16D 21/04
192/66.23
2,042,235 A * 5/1936 Misiak, Jr. .......... F16H 61/0293
192/46
(Continued)

FOREIGN PATENT DOCUMENTS

CN          1568249 A      1/2005
CN        101384473 A      3/2009
(Continued)

OTHER PUBLICATIONS

International Search Report for PCT/EP2010/069996, May 13, 2011, 6 pages; 2 pages translated.
(Continued)

*Primary Examiner* — William C Joyce
(74) *Attorney, Agent, or Firm* — Reising Ethington P.C.

(57) ABSTRACT

A shifting device for a transmission unit of a vehicle, in particular a vehicle that is driven by muscle force. The transmission unit has a first shaft, which is formed as a hollow shaft, on which a plurality of free gears is mounted. The free gears are in engagement with a corresponding plurality of gearwheels, which are mounted on a second shaft, wherein the free gears are connectable to the first shaft by means of selecting devices. The selecting devices can be actuated by means of a camshaft arranged coaxially in the first shaft, wherein the camshaft is connected to a driving device in order to be rotated relative to the first shaft to actuate the selecting devices.

10 Claims, 16 Drawing Sheets

Related U.S. Application Data continuation of application No. PCT/EP2010/069996, filed on Dec. 16, 2010.

(51) Int. Cl.
| | |
|---|---|
| *B62M 11/06* | (2006.01) |
| *B62M 11/14* | (2006.01) |
| *F16H 37/04* | (2006.01) |
| *B62M 11/04* | (2006.01) |

(52) U.S. Cl.
CPC ............ *B62M 11/145* (2013.01); *F16H 3/08* (2013.01); *F16H 37/04* (2013.01); *Y10T 74/19233* (2015.01); *Y10T 74/19279* (2015.01)

(58) Field of Classification Search
USPC ................ 74/325, 372; 192/56.6; 464/42–47
See application file for complete search history.

(56) References Cited

U.S. PATENT DOCUMENTS

| | | | | |
|---|---|---|---|---|
| 3,817,123 A | * | 6/1974 | Whateley | ................ F16H 3/095 74/331 |
| 4,271,942 A | * | 6/1981 | Ballendux | .............. B60K 17/28 192/48.91 |
| 5,924,950 A | | 7/1999 | Pusic | |
| 6,065,361 A | * | 5/2000 | Martin | ................... B62M 17/00 192/84.3 |
| 6,357,312 B1 | * | 3/2002 | Martin | ...................... F16H 3/10 74/363 |
| 8,628,447 B2 | | 1/2014 | Schmitz et al. | |

FOREIGN PATENT DOCUMENTS

| | | |
|---|---|---|
| EP | 1 445 088 A2 | 8/2004 |
| WO | WO2008/089932 A1 | 7/2008 |

OTHER PUBLICATIONS

Written Opinion for PCT/EP2010/069996, dated May 13, 2011, 10 pages.
CN Office Action (translated) dated Oct. 10, 2013 for corresponding CN application No. 201080064194.1, 34 pages.

\* cited by examiner

SHIFTING DEVICE AND GEAR UNIT

CROSS-REFERENCE TO RELATED APPLICATIONS

This application is a Divisional of U.S. application Ser. No. 13/525,493 filed Jun. 18, 2012, now U.S. Pat. No. 8,628,447, which is a Continuation application of International patent application PCT/EP 2010/069996, filed Dec. 16, 2010, which claims the priority of German patent application DE 10 2009 060 484.7, filed Dec. 18, 2009.

BACKGROUND OF THE INVENTION

The present invention relates to a shifting device for a transmission unit of a vehicle, in particular a vehicle that is driven by muscle force, having a first shaft, which is formed as a hollow shaft, on which a plurality of free gears is mounted, wherein the free gears are in engagement with a corresponding plurality of gearwheels, which are mounted on a second shaft, wherein the free gears are connectable to the first shaft by means of selecting means, wherein the selecting means can be actuated by means of a camshaft arranged coaxially in the first shaft, wherein the camshaft is connected to driving means in order to be rotated relative to the first shaft to actuate the selecting means.

The present invention furthermore relates to a gear unit for a vehicle, in particular a vehicle that is driven by muscle force, having a first shaft, on which a plurality of first gearwheels is mounted, a second shaft, on which a corresponding plurality of second gearwheels is mounted, wherein the second gearwheels are in engagement with the corresponding first gearwheels.

The present invention furthermore relates to a vehicle having a frame and a gear unit, which has a first shaft, on which a plurality of first gearwheels is mounted, and a second shaft, on which a corresponding plurality of second gearwheels is mounted, wherein the second gearwheels are in engagement with the first gearwheels, wherein the first and the second shaft are mounted in a gear case which at least partially surrounds the gear unit.

Gear units of this kind are used to provide different transmission ratios for driving a vehicle, in particular a vehicle that is driven by muscle power.

There are fundamentally three types of gear shift for vehicles or bicycles driven by muscle power, namely derailleurs, hub gears and bicycle transmissions.

The derailleur has remained essentially unchanged in the last few decades. In this case, a chain transmits the motive power from a crank to the rear axle of the bicycle, and a set of sprockets comprising up to 11 sprockets is mounted on the rear axle, between which it is possible to shift by means of a frame-mounted derailleur for controlling the chain. Moreover, most bicycles are additionally fitted with a shift mechanism at the chain wheel associated with the bottom bracket. In this case, up to three chain wheels are mounted on the crank, and it is possible to shift between them by means of a front derailleur attached to the frame. Derailleurs of this kind provide up to 30 gears, although, by the nature of the system, many of the gears are redundant and some gears are of limited or no use due to high frictional losses caused by diagonal chain alignment.

The disadvantage with the derailleur principle is that, in addition to the large number of redundant gears and the frictional losses, the components are exposed and are therefore directly subject to environmental influences such as water and dirt and can very easily be damaged by impact.

The second type of commercially available bicycle shift mechanism is the hub gear. In contrast to the derailleur, this is understood to mean a gear mechanism built into the hub casing of the rear axle. A hub gear generally has no external shift components and is therefore not susceptible to impact and less exposed to environmental influences than the derailleur. A hub gear of the kind known from DE 197 20 794 A1, for example, can currently provide up to 14 gears. The disadvantage with the principle of the hub gear in the rear axle is that the weight of the rotating masses is increased, and, in the case of bicycles with rear wheel suspension, that the unsprung mass relative to the total weight is increased. Moreover, the center of gravity of the bicycle shifts in the direction of the rear axle, and this has a disadvantageous effect on the ride characteristics of the bicycle, especially in the case of mountain bikes with rear wheel suspension.

A hub gear of this kind is known from EP 0 383 350 B1, for example, in which two planetary mechanisms are arranged coaxially with a hub fixed with respect to a housing, wherein the input shaft can be connected to planet carriers, and the sun gears of the planetary mechanism can be connected for conjoint rotation, by means of a rotatable shifting device, to the hub fixed with respect to the housing in order to provide different transmission ratios in the overall gear mechanism. The disadvantage with this gear mechanism is that the construction of the overall gear mechanism is complex and is therefore, on the one hand, expensive to produce and, on the other hand, has a high weight due to the large number of components while providing only a small number of achievable gears.

The third variant of bicycle shift mechanisms are the bicycle transmissions mounted in the region of the bottom bracket or bottom bracket transmissions. This type of bicycle shift mechanism is never or only very rarely found on commercially available bicycles. In general, bicycle transmissions of this kind have the advantage over conventional derailleurs or hub gears that they do not have any exposed components and are therefore protected from impact and environmental influences, and furthermore shift the center of gravity of the bicycle to the center while, at the same time, reducing the total unsprung mass. This is particularly advantageous in mountain bike sport. One technical challenge with bicycle transmissions of this kind is to provide a compact construction combined with a large number of selectable gears.

U.S. Pat. No. 5,924,950 A discloses a bicycle transmission having an input shaft, on which a plurality of drive gears is mounted, and a countershaft, on which a corresponding number of selectable driven gears is mounted. The selectable gears on the countershaft are selected by means of a plurality of axially movable shift pins and freewheels arranged in the countershaft, wherein the countershaft is connected to a pinion as an output member of the vehicle transmission via a planetary mechanism. The pinion is connected to the sun gear of the planetary mechanism via a clutch, and the annulus of the planetary mechanism can be braked by means of a Bowden cable. By means of this bicycle transmission, it is possible to obtain 14 gears. The disadvantage with this system is the large axial extent of the design and the relatively small number of gears that can be obtained, namely 14.

WO 2008/089932 A1 furthermore discloses a gear unit for bicycles, in which a high number of gears can be obtained using two countershafts and an additional transmission subsection, by multiplying the individual gears of the two transmission subsections, and, at the same time, a compact construction can be achieved. The disadvantage with this gear unit is that a camshaft is moved axially to select the free gears and, as a result, the axial extent of the transmission design is great.

EP 1 982 913 A1 discloses a transmission for bicycles in which free gears are mounted on an input shaft of the transmission and can be connected selectively to the input shaft by means of a sleeve mounted in the shaft, wherein the sleeve is turned relative to the input shaft by means of two planetary mechanisms in order to select the free gears. The planetary mechanisms are arranged coaxially with the input shaft and are actuated by means of a selector shaft, which is offset parallel to the input shaft and is connected to a Bowden cable. The selector shaft is connected for conjoint rotation to a planet carrier of one of the planetary mechanisms by a spur gear mechanism in order to transmit the rotation of the selector shaft to the sleeve. The disadvantage with this transmission is that the additional rotation is transmitted to the planetary mechanism by means of the selector shaft which is offset in parallel, thereby requiring a large amount of installation space for the gear unit.

BRIEF SUMMARY OF THE INVENTION

It is therefore an object of the present invention to provide an improved shifting device and an improved gear unit for a vehicle, in particular a vehicle that is driven by muscle force, which, in particular, is of more compact construction, permits a large number of gears and simultaneously a reduced total weight, and is simple to operate, as compared with the known shifting devices and gear units.

In the context of the invention, vehicles driven by muscle force are taken to be vehicles which are driven exclusively by muscle force or in which muscle force in combination with a power unit, e.g. an internal combustion engine or an electric drive, is used to drive the vehicle.

According to a first aspect of the invention, this object is achieved, in the shifting device mentioned at the outset, by virtue of the fact that the driving means have a rotational speed superimposition gear unit, which is arranged coaxially with the first shaft, wherein a second camshaft is arranged coaxially in the first shaft in order to connect a plurality of second free gears, which are mounted on the first shaft, to the first shaft by means of selecting means.

According to a second aspect of the invention, the abovementioned object is furthermore achieved in the shifting device mentioned in the outset by virtue of the fact that the driving means have two planetary gear units, wherein planet carriers of the planetary mechanisms are connected to one another.

According to a third aspect of the invention, the abovementioned object is furthermore achieved in the shifting device mentioned at the outset by virtue of the fact that the camshaft can be connected to the first shaft by means of latching means in at least one rotational position.

According to a fourth aspect of the invention, the abovementioned object is furthermore achieved in the shifting device mentioned at the outset by virtue of the fact that a second camshaft is arranged coaxially in the first shaft and can be rotated relative to the first shaft by means of a tappet of the first camshaft.

According to a fifth aspect of the invention, the abovementioned object is furthermore achieved by virtue of the fact that a spring sleeve is arranged in the first shaft, surrounding the camshaft circumferentially, in order to preload the selecting means with a spring force.

According to a sixth aspect of the invention, the abovementioned object is furthermore achieved in the gear unit mentioned at the outset by virtue of the fact that at least one of the second gearwheels can be connected nonpositively to the second shaft by means of a clutch.

According to a seventh aspect of the invention, the abovementioned object is furthermore achieved in the vehicle mentioned at the outset by virtue of the fact that the gear case is connected to the frame by means of damping members in order to mechanically decouple the frame at least partially from the gear unit.

According to one embodiment of the invention, a transmission is provided, having a shaft, which is designed as a hollow shaft, on which a plurality of free gears is mounted, which can be connected to the hollow shaft by means of selecting means, wherein the selecting means can be actuated by means of a rotatable camshaft, wherein the free gears form sun gears of planetary gearsets, and planet carriers and/or ring gears of the planetary gearsets are connectable to the shaft and/or to an output shaft. It is thereby possible to obtain additional gear stages in the transmission.

In this arrangement, the output shaft is preferably mounted coaxially with the shaft. A particularly compact construction is possible as a result. It is preferable if the planet carrier can be connected to the shaft by means of selecting means, wherein the selecting means can be actuated by means of the rotatable camshaft. This makes it possible to dispense with an additional camshaft or further actuating means.

One advantage of the first aspect of the shifting device according to the invention is that the rotational speed superimposition gear unit, which is arranged coaxially with the shaft, and the second camshaft make it possible to achieve a compact gear unit with a large number of gears.

One advantage of the second aspect of the shifting device according to the invention is that the combination of two rotational speed superimposition gear units makes it possible to achieve the rotation of the camshaft in the first shaft with few components and hence that the total weight of the transmission is limited.

One advantage of the third aspect of the invention is that the latching means for accurate positioning of the camshaft relative to the first shaft within the transmission make it possible to dispense with external indexing shift levers, which are expensive and simultaneously vulnerable.

One advantage of the fourth aspect of the invention is that it is possible to dispense with two independent shift levers, making shifting particularly convenient. In this arrangement, the driving means can be mechanical, electric and/or hydraulic driving means.

One advantage of the fifth aspect of the invention is that the selecting means can be reliably preloaded by means of a simple-to-fit spring sleeve, thus enabling the outlay on assembly to be considerably reduced.

One advantage of the sixth aspect of the invention is that the torque which can be transmitted is limited, and this enables the gearwheels to be designed for a lower permissible maximum torque, thereby allowing the weight and overall size of the gear unit to be reduced.

One advantage of the seventh aspect of the invention is that vibration and noise generated by the gear unit cannot be transmitted to the frame of the vehicle and that resonant vibration is attenuated, thereby allowing an improvement in ride comfort.

In the case of the first aspect of the invention, the second free gears are preferably in engagement with a corresponding plurality of gearwheels, which are mounted on a third shaft, wherein the second free gears form gear pairs of a second transmission subsection with the gearwheels.

It is generally preferred if the rotational speed superimposition gear unit is arranged at one axial end of the shaft.

A construction which is particularly compact in the radial direction is thereby possible.

A ring gear of the second of the planetary gear units is preferably connected to actuating means.

This enables an additional rotation from the outside to be transmitted to the camshaft in a simple manner.

The actuating means are preferably arranged coaxially to the first shaft.

This arrangement enables a rotation from the outside to be imparted to the camshaft by structurally simple means, thereby allowing a particularly compact construction of the transmission.

The actuating means preferably have a cable pulley, which is mounted coaxially with the first shaft. The cable pulley is preferably connected rotationally fixed to the ring gear. In a special embodiment, the cable pulley is formed integrally with the annulus. A particularly light construction of the actuating means is thereby possible.

A sun gear of the first planetary gear unit is preferably connected to the camshaft for conjoint rotation.

This makes it possible to connect the planetary mechanism to the camshaft without additional design outlay, thereby allowing a generally compact construction.

It is furthermore preferred if a sun gear of the second planetary mechanism is connected rotationally fixed to the first shaft.

This enables the rotation of the first shaft to be transmitted to the planetary mechanism and the camshaft with little design outlay.

It is furthermore preferred if the rotation speed superimposition gear unit is designed in such a way that the camshaft rotates in synchronism with the first shaft. In this case, the rotation speed superimposition gear unit is designed in such a way that, in normal operation, when the ring gear of the second planetary mechanism is not rotating, i.e. is not selected, the camshaft rotates in synchronism with the first shaft.

As a result, the shift states set are retained while the first shaft rotates and the ring gear remains stationary.

In the case of the third aspect of the invention, it is preferred if the latching means have a first latching member, which is connected rotationally fixed to the camshaft, and a second latching member, which is connected rotationally fixed to the first shaft.

This enables a certain fixed shift state to be set without external latching means.

It is furthermore preferred if the latching means are arranged coaxially with the first shaft.

As a result, the latching means can be implemented without any additional space requirement, thereby making possible a compact construction.

It is furthermore preferred if at least one of the latching members is arranged in the first shaft.

This makes it possible to achieve a compact gear unit construction because unused installation space in the first shaft is utilized.

It is furthermore preferred if the latching means have at least one nose and at least one groove in order to latch in the at least one rotational position.

As a result, the latching means are particularly robust and reliable because they can be implemented without additional moving parts.

It is furthermore preferred if at least one of the latching members is spring-mounted so as to be axially movable.

On the one hand, this ensures that the latching means connect the first shaft and the camshaft in one rotational position and, at the same time, the latching connection can be released from the rotational position without an additional mechanism by applying a torque.

It is furthermore preferred if the second camshaft can be rotated relative to the first shaft by means of a tappet of the first camshaft.

This makes it possible to dispense with a second, independent shift lever, thereby making control of the shifting device particularly simple and convenient.

In the invention, it is preferred if the second camshaft is connectable to the first shaft in at least one rotational position by means of latching means.

This makes it possible to obtain a set shift state of the second transmission subsection by simple means, without external actuation, thereby also preventing unintentional shifting.

It is furthermore preferred if the second camshaft is spring-mounted so as to be axially movable.

It is thereby possible to ensure that the latching means latch with the first shaft in the predefined rotational position and can be released from the rotational position by applying a torque.

It is furthermore preferred if the latching means have at least one nose and at least one groove in order to latch in the at least one rotational position.

As a result, the latching means are particularly robust and reliable because it is possible to dispense with additional moving parts.

It is furthermore preferred if the tappet has a movable tappet element, which slides on a sliding section, which is connected rotationally fixed to the first shaft.

As a result, the second camshaft can be turned through a certain angle of rotation relative to the first shaft at certain rotational positions, and simple, logical linking of the two camshafts can be achieved.

It is furthermore preferred if the tappet element is mounted in a recess of a tappet member so as to be movable in a radial direction.

As a result, the tappet element can be brought into releasable engagement with the second camshaft with little design outlay and a small space requirement.

It is furthermore preferred if the tappet member is connected rotationally fixed to the first camshaft.

As a result, the rotation of the first camshaft can be transmitted to the tappet and thus logical linking of the shifting of the two transmission subsections can be achieved.

It is furthermore preferred if the sliding section has at least one cam, by means of which the tappet element can be moved in a radial direction.

This enables the second camshaft to be taken along and rotated, more specifically by a particular angle of rotation, at a predetermined rotational position of the first camshaft relative to the first shaft.

It is furthermore preferred if the tappet element can be brought into engagement with the second camshaft in order to connect the first camshaft to the second camshaft rotationally fixed.

This enables the rotation of the first camshaft to be transmitted to the second camshaft without actuation from outside.

It is furthermore preferred if the selecting means are designed as selectable freewheels.

This enables the free gears to be connected rotationally fixed to the first shaft by simple and compact selecting means.

The selecting means preferably have selector pawls, which can be brought into engagement with internal toothing of the free gears.

This makes it possible to obtain actuatable freewheels which can accept a high torque because they transmit force in a tangential direction from the free gear to the shaft.

It is furthermore preferred if the camshafts have actuating sections, by means of which the freewheels can be actuated.

This enables the freewheels to be brought into engagement with the free gears by means of a measure of simple design.

It is furthermore preferred if the camshafts are designed in such a way that freewheels of two successive gears stages can be brought into engagement simultaneously with the free gears.

This makes it possible to obtain a power shift transmission because the freewheel of the higher gear is brought into engagement with the corresponding free gear while the freewheel of the lower gear is freewheeling. Moreover, idle rotation is avoided.

In the case of the fourth aspect of the invention, it is preferred if spring elements, each assigned to one of the selecting means, are formed on the spring sleeve.

This makes it possible to provide low-cost spring elements for the selecting means that can be mounted easily in the first shaft.

It is preferred if the spring elements are formed integrally with the spring sleeve.

This makes it possible to manufacture the spring elements at particularly low cost.

In the case of the fifth aspect of the invention, it is preferred if the clutch connects the corresponding gearwheel nonpositively to the second shaft up to a predetermined torque.

As a result, the gearwheels can transmit a torque to the second shaft without restriction up to a certain magnitude.

It is furthermore preferred if the gearwheel slides on the second shaft at a torque above the predetermined torque.

This makes it possible, by simple means, to avoid overloading of the gearwheels and accordingly to design the gearwheels for lower loads, thereby making lighter construction possible.

It is furthermore preferred if the predetermined torque is adjustable.

This enables the gear unit to be matched specifically to certain load states.

The second shaft is preferably an input shaft of the gear unit. This makes it possible to limit the torque introduced into the gear unit.

Needless to say, the features which are mentioned above and those which will be explained below can be used not only in the respectively indicated combination but also in other combinations or in isolation without exceeding the scope of the present invention.

BRIEF DESCRIPTION OF THE SEVERAL VIEWS OF THE DRAWING

Illustrative embodiments of the invention are shown in the drawing and explained in greater detail in the following description. In the drawing.

DETAILED DESCRIPTION OF THE INVENTION

Figure 1:
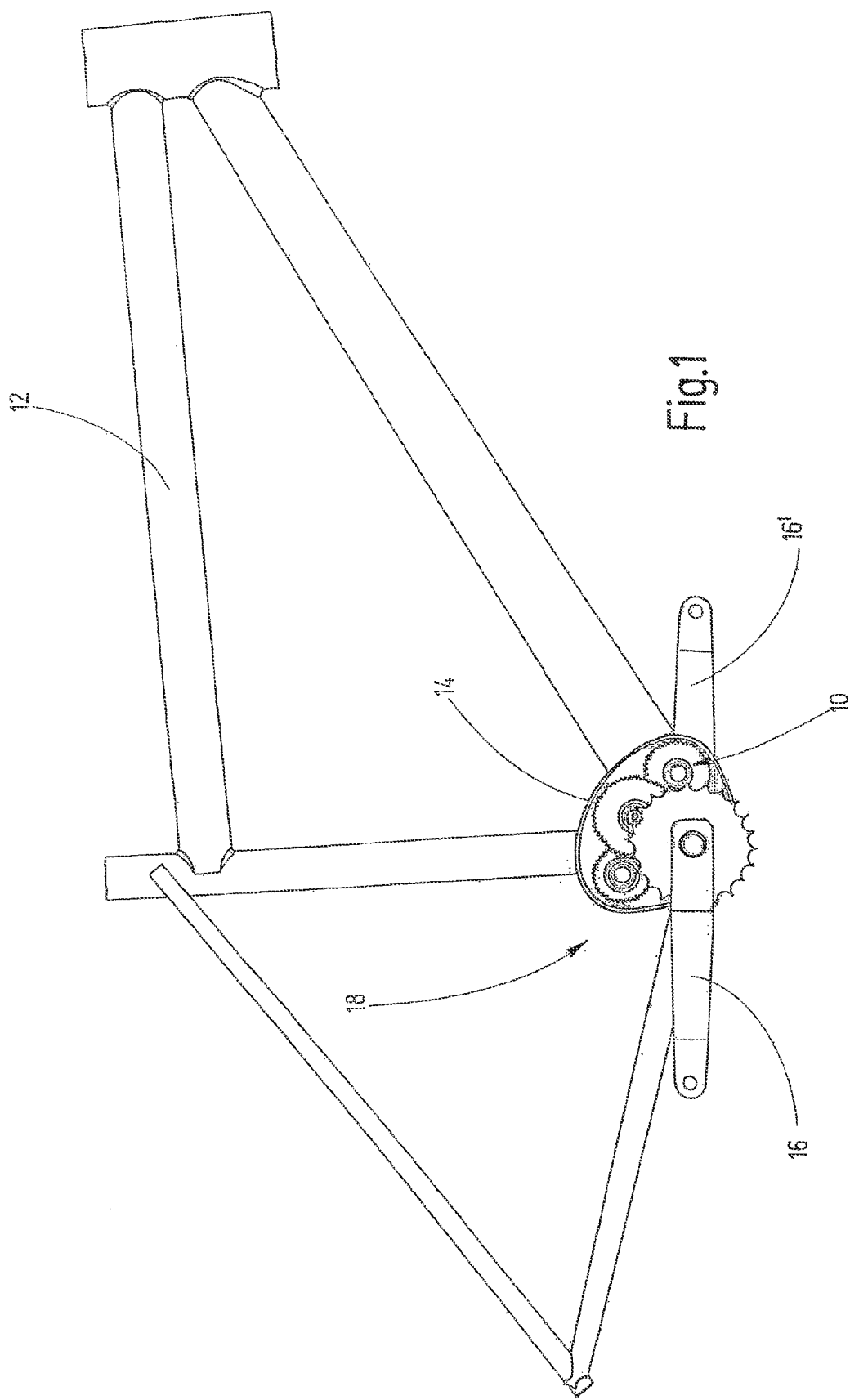
FIG. 1 shows a side view of a bicycle frame having a multi-speed transmission.

In FIG. 1, a gear unit is designated in general by 10.

FIG. 1 shows a side view of a bicycle frame 12, which has a gear case 14, in which the gear unit 10 is housed. In this illustration, the gear unit 10 is indicated only schematically and is designed as a compact unit, which is preferably arranged in a gear cage (not shown here). Here, the gear unit 10 is described by way of example for use with a bicycle but it can also be used on other vehicles operated by muscle force. Needless to say, the gear unit 10 can also be used for vehicles in which muscle force is used in combination with a power unit for driving the vehicle.

The gear unit 10 and the gear case 14 together with cranks 16 and 16' form a multi-speed transmission 18.

Figure 2:
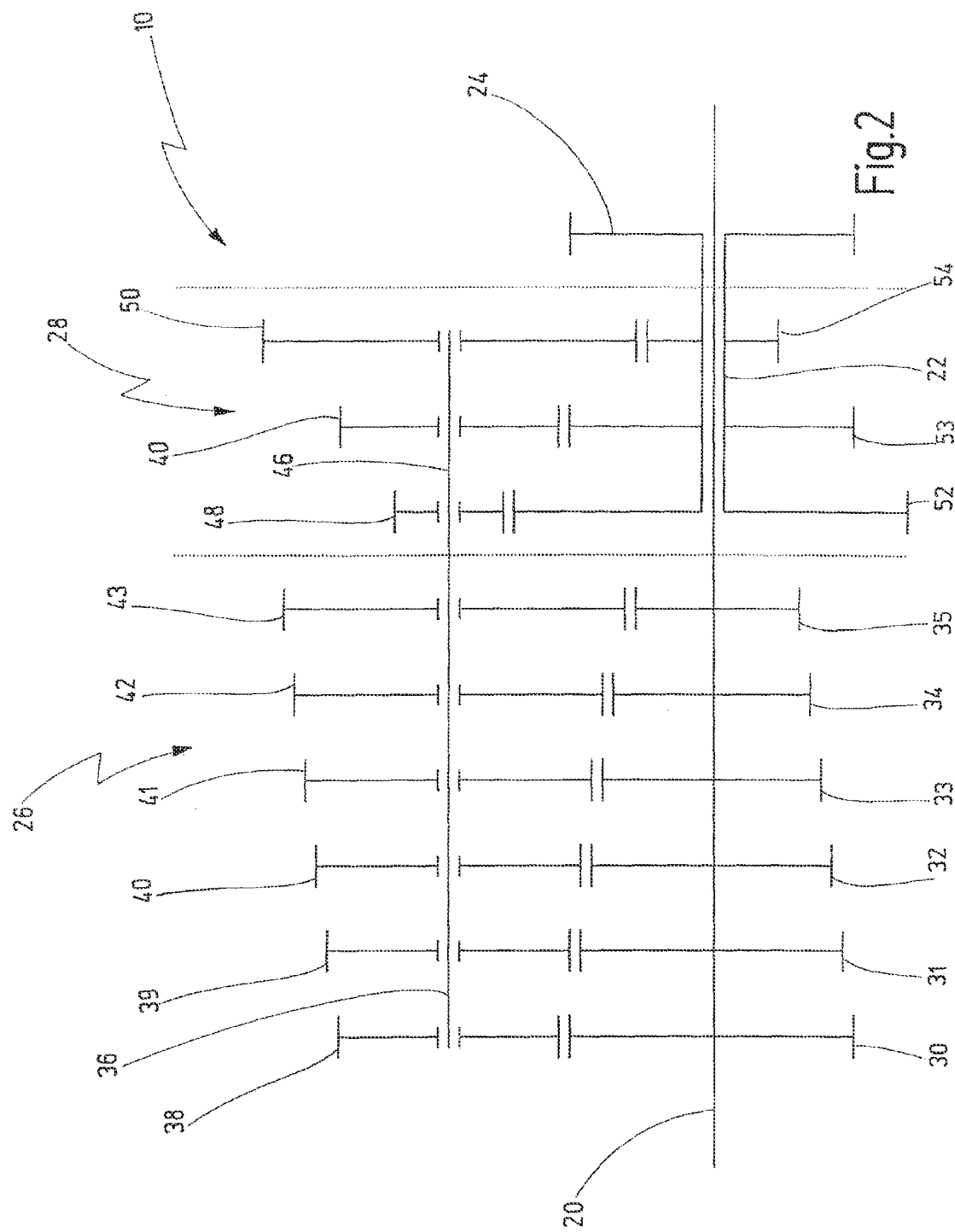
FIG. 2 shows a shift diagram of a multi-speed transmission comprising two transmission subsections and a common countershaft.

FIG. 2 shows a shift diagram of the gear unit 10.

The gear unit 10 has an input shaft 20 and an output shaft 22. The input shaft 20 is designed as a through shaft. The output shaft 22 is designed as a hollow shaft. The input shaft 20 and the output shaft 22 are arranged coaxially with one another. The output shaft 22 is connected rotationally fixed to a chain wheel 24, which forms an output member of the gear unit 10.

The gear unit 10 has a first transmission subsection 26 and a second transmission subsection 28. A plurality of driving gears 30, 31, 32, 33, 34, 35 is mounted on the input shaft 20. The first transmission subsection 26 has a countershaft 36.

Mounted on the countershaft 36 are driven gears 38, 39, 40, 41, 42, 43. The driven gears 38 to 43 are designed as free gears.

The driven gears 38 to 43 can be connected to the countershaft 36 by means of selecting means (not shown). The driven gears 38 to 43 and the driving gears 30 to 35 form gear pairs which have different transmission ratios, thus enabling different gear stages to be obtained by selectively connecting the driven gears 38 to 43 to the countershaft 36.

The second transmission subsection 28 has an input shaft 46. On the input shaft 46 driving gears 48, 49, 50 are mounted. The driving gears 48 to 50 are designed as free gears. The driving gears 48 to 50 can be connected rotationally fixed to the input shaft 46 by means of selecting means. The driven gears 52, 53, 54 are mounted on the output shaft 22. The driven gears 52 to 54 mesh with the driving gears 48 to 50.

The intermeshing driven gears 52 to 54 and driving gears 48 to 50 form gear pairs which have different transmission ratios. The driving gears 48 to 50 can be connected rotationally fixed to the input shaft 46 by means of selecting means (not shown), thereby forming different selectable gear stages of the second transmission subsection 28.

The countershaft 36 of the first transmission subsection 26 is connected rotationally fixed to the input shaft of the second transmission subsection 28. The countershaft 36 is preferably formed integrally with the input shaft 46.

The driving gears 30 to 35 are each preferably connected nonpositively to the input shaft 20 by means of a clutch (not shown), in particular frictionally by means of a friction clutch. The clutch is designed to limit a torque introduced into the gear unit 10. The clutch is designed so that the connection between the input shaft 20 and the corresponding driving gear 30 to 35 slips if a predefined or adjustable torque is exceeded. By means of such torque limitation, the overall size and weight of the gear unit can be reduced since the gear unit can be designed for a relatively low maximum torque.

By virtue of the fact that the first transmission subsection 26 is connected to the second transmission subsection 28, the possible achievable gear stages of the first transmission subsection 26 are multiplied by the gear stages of the second transmission subsection 28. Thus, eighteen gears can be achieved by the gear unit 10 illustrated in FIG. 2.

It is furthermore conceivable for the input shaft 20 to be connected rotationally fixed to the output shaft 22 by means of a clutch (not shown). It would thereby be possible to achieve an additional gear as a direct gear.

Figure 3:
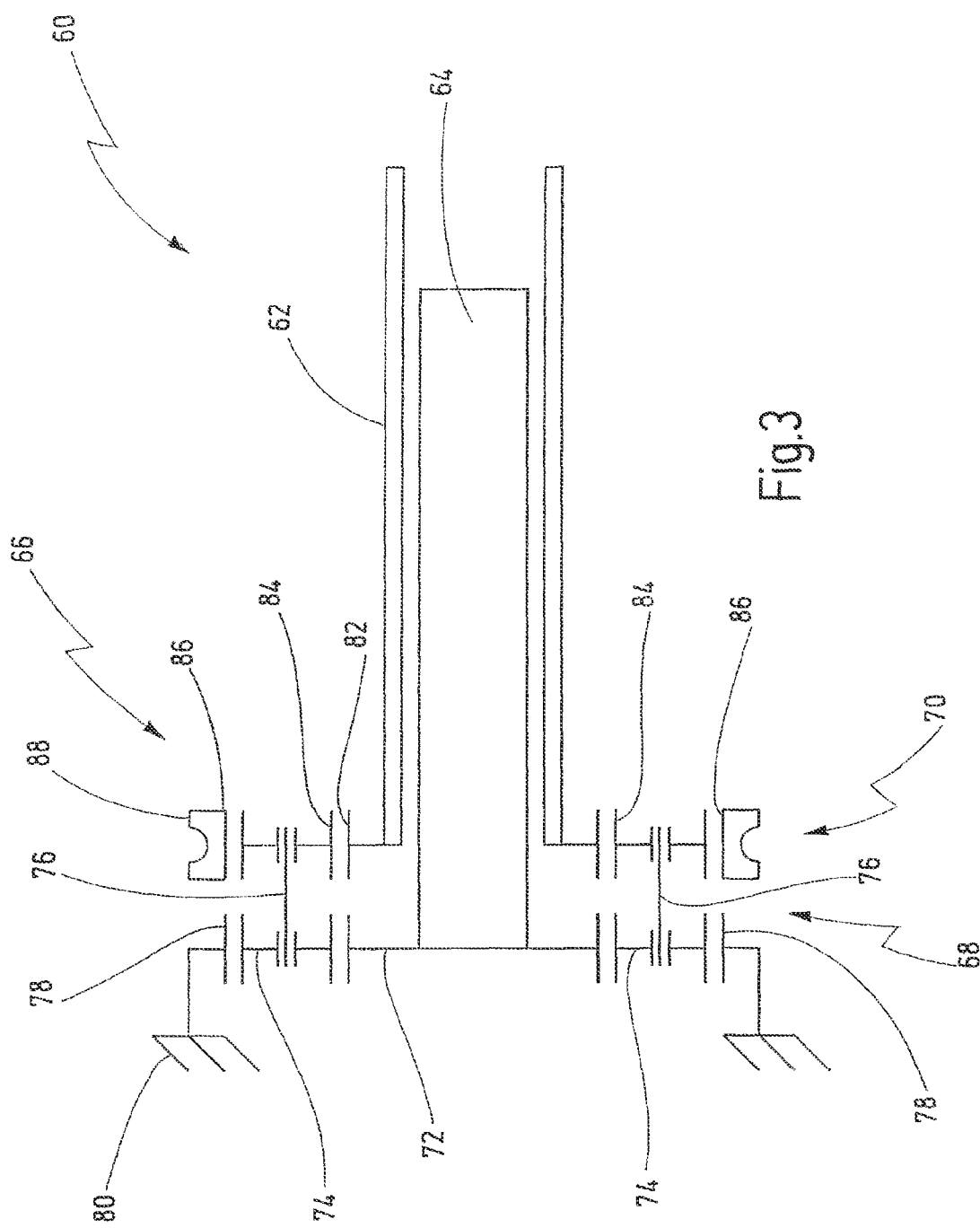
FIG. 3 shows a shift diagram of a shifting device with a rotatable camshaft and two planetary mechanisms.

A shift diagram of a shifting device with a rotatable camshaft is illustrated schematically in FIG. 3. In FIG. 3, a shifting device is designated in general by 60.

In general terms, the shifting device 60 serves to connect free gears (not shown) mounted on a shaft 62 selectively rotationally fixed to shaft 62 by means of selecting means (not shown). The shifting device 60 has a camshaft 64, which is arranged coaxially in shaft 62 and is mounted so as to be rotatable relative to the latter. Arranged at one axial end of shaft 62 is a speed superimposition transmission 66, which is connected both to shaft 62 and to the camshaft 64. The speed superimposition transmission 66 is arranged coaxially with shaft 62. The speed superimposition transmission 66 is formed by a transmission stage 68 and a control stage 70. The control stage 70 is connected to shaft 62, and the transmission stage 68 is connected to the camshaft 64. As an alternative, it is also possible for the control stage 70 to be connected to the camshaft 64 and for the transmission stage 68 to be connected to shaft 62. The transmission stage 68 is formed by a first planetary gear unit 68. The control stage 70 is formed by a second planetary mechanism 70. The first planetary mechanism 68 has a sun gear 72, which is connected rotationally fixed to the camshaft 64. The first planetary gear unit 68 has planet gears 74, which are mounted on a planet carrier 76. The planet gears 74 mesh with the sun gear 72. The first planetary gear unit 68 has a ring gear 78, with which the planet gears 74 mesh. The ring gear 78 is fixed at a fixed reference point 80, preferably a gear cage or gear case (not shown), and is connected rotationally fixed to the latter.

The second planetary gear unit 70 has a sun gear 82, which is connected rotationally fixed to shaft 62. The second planetary gear unit 70 has planet gears 84, which are mounted on the planet carrier 76. The planet gears 84 mesh with the sun gear 82. The second planetary gear unit 70 has a ring gear 86, with which the planet gears 84 mesh. The ring gear 86 is connected rotationally fixed to a cable pulley 88, to which a Bowden cable (not shown) can be attached.

The first planetary gear unit 68 and the second planetary gear unit 70 are dimensioned in such a way that, when the ring gear 86 is stationary or held fixed, the transmission ratio from shaft 62 to the camshaft 64 is precisely 1, with the result that, in this case, shaft 62 and the camshaft 64 rotate in synchronism or at the same speed. The second planetary gear unit 70 or control stage 70 serves to superimpose an additional speed on the speed of shaft 62. This additional speed is transmitted via the ring gear 86 to the planet carrier 76. Owing to the fact that the planet gears 84 of the second planetary gear unit 70 and the planet gears 74 of the first planetary gear unit 68 are connected to one another by a planet carrier 76, a total speed as the sum of the speed of shaft 62 and of the rotation of the ring gear 86 is transmitted to the first planetary gear unit 68. The first planetary gear unit 68 or transmission stage 68 serves to transmit the total speed to the camshaft 64. The ring gear 86 is connected to the cable pulley 88 for conjoint rotation so that it can be actuated by means of a Bowden cable (not shown). Here, the cable pulley 88 is rotated by a certain angle of rotation in the direction of rotation of shaft 62 or counter to the direction of rotation of shaft 62 in order to transmit this relative motion to the camshaft 64. It is thereby possible to select the gears of the gear unit 10 by actuating the Bowden cable. The sun gear 62 is preferably designed as part of shaft 62 or is formed integrally with shaft 62.

In an alternative embodiment, the two ring gears 78, 86 are mounted so as to be freely rotatable and are connected to one another rotationally fixed. In this embodiment, the planet gears 74, 84 are each connected by means of a separate planet carrier. One of the planet carriers is connected to the cable pulley 88 in order to transmit the rotation of the cable pulley 88 to the camshaft 64.

In an alternative embodiment, it is also conceivable for the sun gears to be connected to one another rotationally fixed and to be mounted so as to be freely rotatable. In this case, shaft 62 would be connected to the planet carrier of planet gears 84, and the camshaft 64 would be connected to the planet carrier of planet gears 74.

Figure 4:
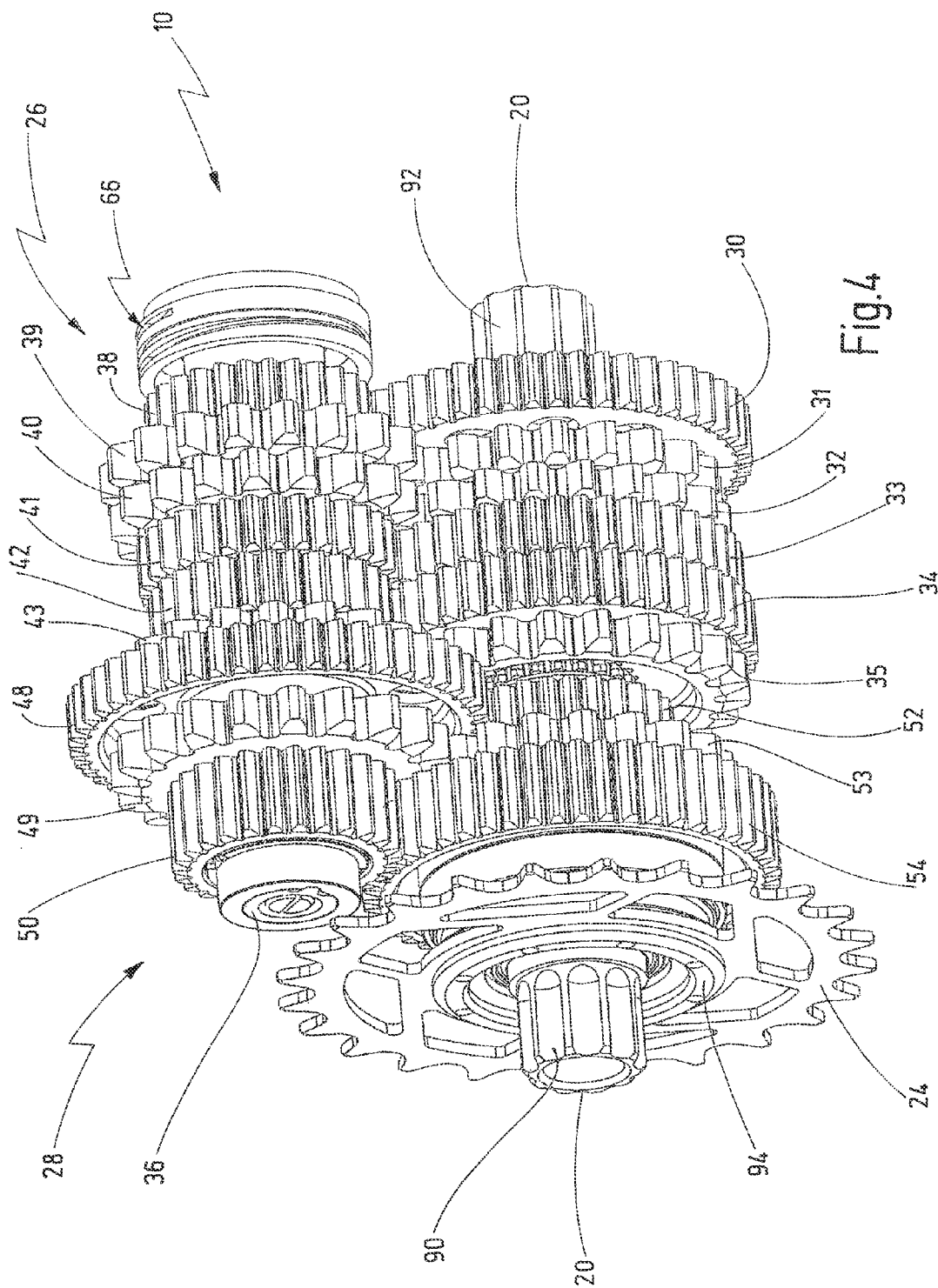
FIG. 4 shows a perspective view of one embodiment of a gear unit having two transmission subsections and a common countershaft.

FIG. 4 shows a perspective view of the gear unit 10. The gear unit 10 corresponds to the shift diagram shown in FIG. 2, with elements that are the same being designated by the same reference numerals and only the differences being explained here.

At the axial ends, the input shaft 20 has connecting sections 90, 92 in order to connect cranks (not shown) to the input shaft 20 rotationally fixed. The chain wheel 24 is mounted at one axial end of the output shaft 22 (not shown).

The chain wheel 24 is connected by means of a central screw 94 to a connecting element (not shown) and is thereby connected to the output shaft 22 rotationally fixed.

The countershaft 36 is arranged parallel to the input shaft 20. The free gears 38 to 43 and 48 to 50 are mounted on the countershaft 36, which is formed integrally with the input shaft 46 of the second transmission subsection 28. The speed superimposition transmission 66 is mounted at one axial end of the countershaft 36. The free gears 38 to 43 and 48 to 50 can be connected to the countershaft 36 or selected by means of the camshaft 64 (not shown) in combination with the selecting means (not shown), wherein the camshaft 64 can be rotated relative to the countershaft 36 by means of the speed superimposition transmission 66.

Figure 5:
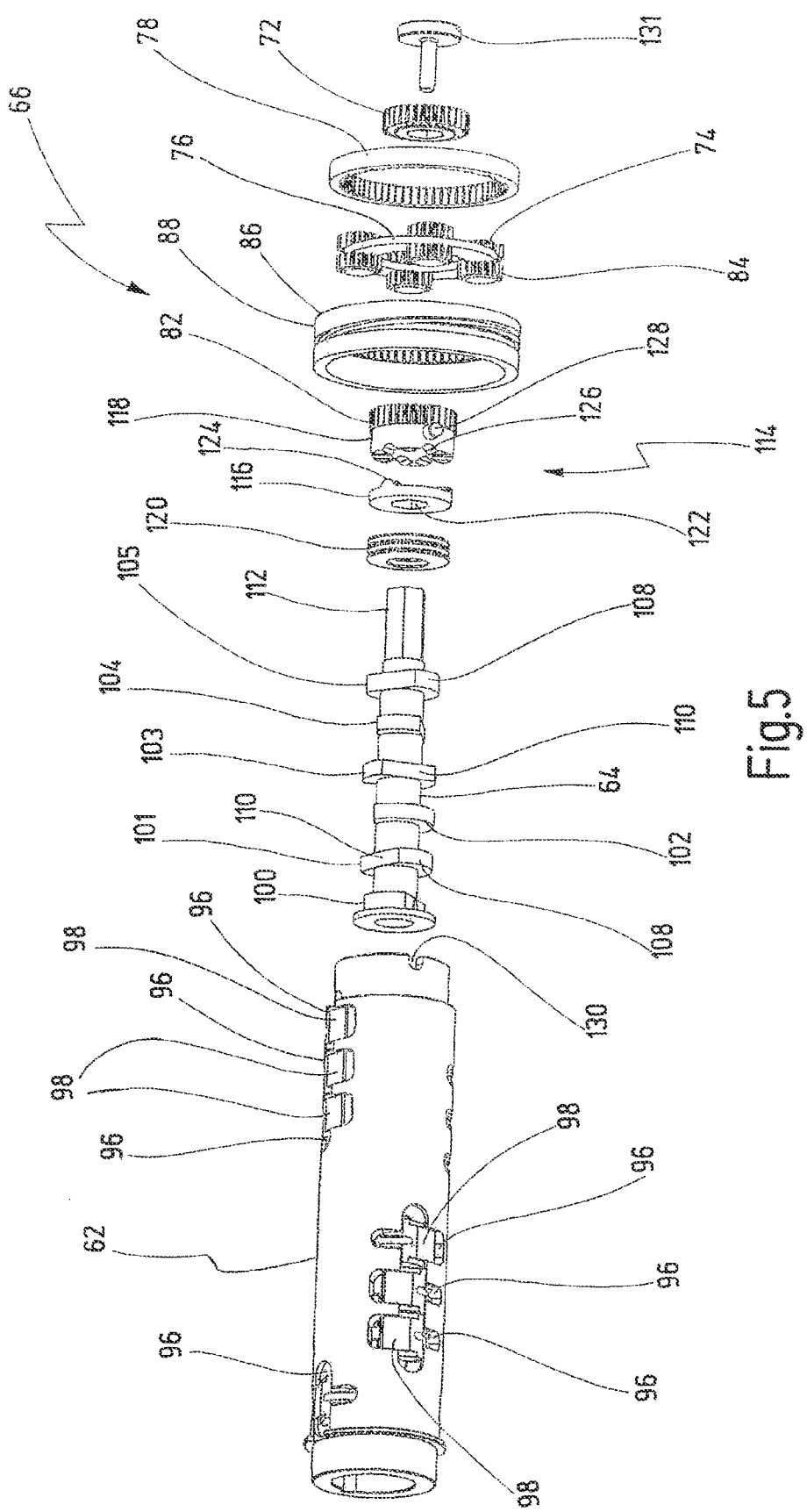
FIG. 5 shows an exploded perspective view of a shaft for supporting selectable free gears with a rotatable camshaft and two planetary mechanisms.

FIG. 5 shows an exploded view of shaft 62, the camshaft 64 and the speed superimposition transmission 66. Elements which are the same are provided with the same reference numerals, and only the differences are explained here.

Shaft 62 has recesses 96, in which freewheel elements 98 or selector pawls 98 are mounted. The selector pawls 98 are used as selecting means in order to connect the free gears 38 to 43 and 48 to 50 mounted on shaft 62 to shaft 62 rotationally fixed. The operation of the selector pawls 98 is explained in greater detail below.

The camshaft 64 has actuating elements 100, 101, 102, 103, 104, 105, which are each assigned to one or two of the selector pawls 98. The actuating elements 100 to 105 each have a sliding section 108 and a cam 110 or two cams 110. The sliding sections 108 are designed as round sections, which are formed coaxially with an axis of rotation of the camshaft 64. The cams 110 are designed as recesses on the actuating elements 100 to 105. The recesses are designed as a level surface on the actuating elements 100 to 105, which form the shape of a secant in an axial projection of the actuating elements 100 to 105. A connecting section 112 is formed at one axial end of the camshaft 64. The connecting section 112 has a hexagon profile 112.

The camshaft 64 is assigned latching means 114. The latching means 114 have a first latching member 116 and a second latching member 118. The latching means 114 furthermore have a spring element 120, which is arranged between the actuating element 105 of the camshaft 64 and the first latching member 116. The spring element 120 is preferably designed as a diaphragm spring assembly. The first latching member 116 has an internal hexagon profile 122, which can be connected to the hexagon profile of the connecting section 112 in a manner which prevents relative rotation and allows axial movement. The first latching member 116 is designed as a disk. Latching member 116 has at least one projection 124 or at least one nose 124, which projects in an axial direction relative to the first latching member 116. The second latching member 118 has a cylindrical shape and is provided at one axial end, the end adjacent to the first latching member 116, with recesses 126 or grooves 126. The second latching member 118 has at least one pin 128, which projects radially relative to the circumferential surface and, in the assembled state of shaft 62, engages in a recess 130 in shaft 62 and connects the second latching member 118 to shaft 62 rotationally fixed. The second latching member 118 furthermore has external toothing, which forms the sun gear 82 of the second planetary gear unit 70. As an alternative to the nose 124 and the grooves 126, the latching means 114 can also be designed as spring-loaded balls.

The sun gear 72 of the first planetary gear unit 68 has an internal hexagon profile, which corresponds to hexagon profile 112. Also illustrated in FIG. 5 is an end element 131, which can be connected to one axial end of the camshaft 64 and supports the speed superimposition transmission 66 in an axial direction and preloads the first latching member 116, the second latching member 118, the spring element 120 and the sun gear 72 against one another.

The actuating elements 100 to 105 of the camshaft 64 are each assigned to one of the selector pawls 98, allowing the selector pawls 98 to be actuated selectively by a rotation of the camshaft 64 relative to shaft 62. In the process, the respective sliding section 108 actuates the selector pawls 98 in such a way that the associated free gear slides on shaft 62, i.e. the corresponding gear is not selected. The respective cam 110 has the effect that the corresponding selector pawl 98 pivots radially outward and connects the associated free gear to shaft 62 rotationally fixed. The cams 110 of the actuating elements 100 to 105 are each formed at different positions on the circumference of the camshaft 64, ensuring that in each case only one selector pawl 98 is actuated or, alternatively, two or more selector pawls 98 are actuated simultaneously, and the corresponding free gear or one of the corresponding free gears is connected to shaft 62 for conjoint rotation, at least in one direction of rotation. The actuating elements 100 to 105 can have one or two cams 110, depending on the number of selector pawls 98 associated therewith. The camshaft 64 has the hexagon profile 112 at one axial end in order to support further elements in a manner which prevents relative rotation and allows axial movement.

The latching means 114 have the first latching member 116, which is supported on the connecting section 112 by the internal hexagon profile 122 in a manner which allows axial movement. The second latching member 118 is connected to shaft 62 rotationally fixed since the pin 128 engages in the recess 130 in shaft 62. The recesses 126, into which the noses 124 of the first latching member 116 can engage, are formed at different angular positions on the second latching member 118. The first latching member 116 is preloaded in an axial direction, namely in the direction of latching member 118, by the spring element 120. The recesses 126 are formed in such a way on the second latching member 118 that the noses 124 can engage in the recesses 126 and fix the camshaft 64 in certain rotational positions relative to shaft 62. The rotational positions are chosen in such a way that they correspond to the defined shift states of the camshaft 64. The noses 124 and the recesses 126 are formed with beveled or rounded flanks to ensure that the first latching member can be moved out of the latching position by an axial movement and the camshaft 64 can be rotated relative to shaft 62 when a torque is applied to the latching means. When a rotation is transmitted to the ring gear 86 via the cable pulley 88, a torque is exerted on the latching means 114. As a result, the first latching member 116 is moved away from the second latching member 118 in an axial direction until the noses 124 are moved out of the recess 126, allowing the camshaft 64 to perform a rotation relative to shaft 62. The first latching member 116 is then turned relative to the second latching member 118 until the noses 124 slide into other recesses 126 and latch into the recess 126 by virtue of the force applied by the spring element 120. The camshaft 64 can be fixed or held in precise predefined shift positions by the latching means 114. As a result, it is possible to dispense with external latching devices, e.g. in a shift lever.

Figure 6:
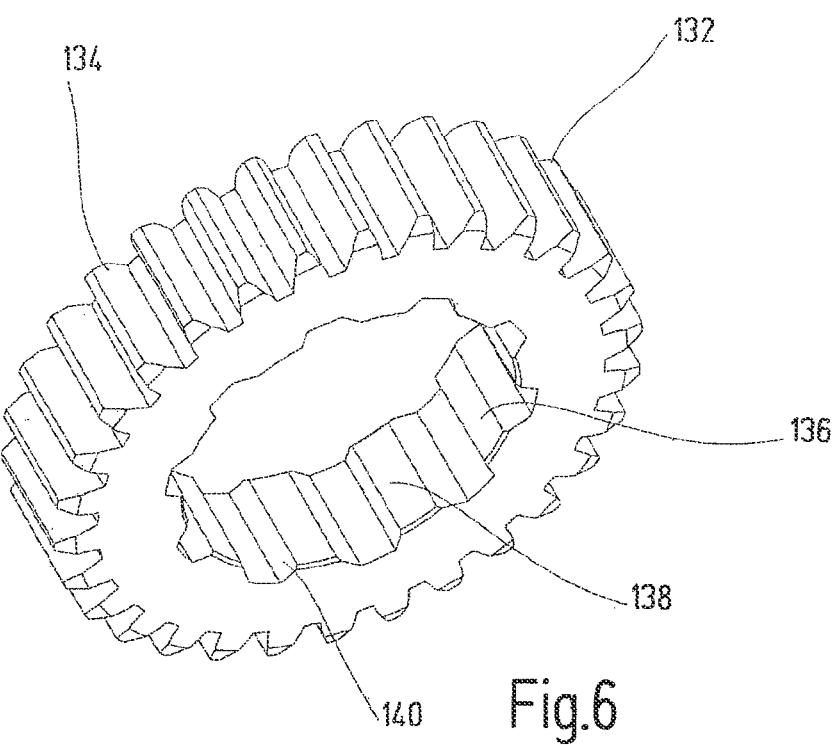
FIG. 6 shows a perspective view of a free gear with internal toothing.

A selectable free gear with internal toothing is illustrated in FIG. 6 and is designated in general by 132.

The free gear 132 has external toothing 134 and internal toothing 136. The external toothing 134 is formed on the outer circumferential surface. The internal toothing is formed on an inner circumferential surface of the free gear 132. The internal toothing 136 has sliding sections 138 and engagement sections 140. The sliding sections 138 are formed by surfaces created in the circumferential direction of the free gear 132. The engagement sections 140 are formed between the sliding sections 138, at an angle to the sliding sections 138.

The external toothing 134 serves to mesh with other gearwheels. The internal toothing 136 serves to support the free gear 132 on shaft 62 and connect it to shaft 62 rotationally fixed by means of selecting means. The sliding sections 138 serve to support the free gear 132 rotatably on shaft 62 and to slide on shaft 62. The engagement sections 140 serve to enable selecting means (not shown), which will be explained in greater detail below, to be brought into engagement with the free gear 132 and to connect the free gear 132 to shaft 62 rotationally fixed.

Figure 7:
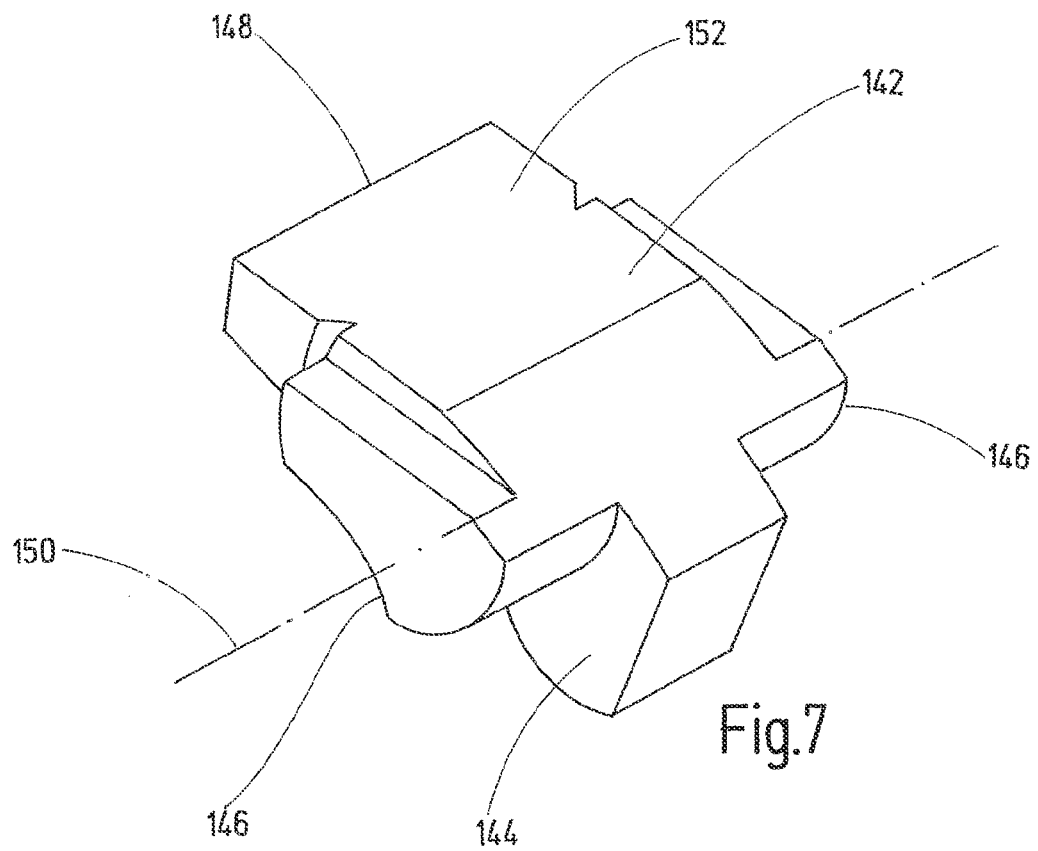
FIG. 7 shows a perspective view of a selector pawl.

A freewheel element or selector pawl for connecting the free gear 132 to shaft 62 for conjoint rotation is illustrated in FIG. 7 and designated in general by 142. The freewheel element 142 has an actuating section 144, which is formed on an underside of the freewheel element 142. The freewheel element 142 has respective support sections 146 on each of two lateral sections. The freewheel element 142 has an engagement section 148. The engagement section 148 is formed on an opposite end of the freewheel element 142 from the actuating section 144. The support sections 146 are formed on opposite sides of the freewheel element 142, namely between the actuating section 144 and the engagement section 148.

The support sections 146 serve to support the freewheel element 142 on a shaft in a manner which allows it to rotate or pivot about an axis of rotation 150. The freewheel element 142 is supported on the shaft in such a way that the actuating section 144 faces toward the interior of the shaft. The freewheel element 142 is furthermore preloaded in such a way by means of a spring element that, when not subjected to a load, the actuating section 144 is pivoted radially inward and the engagement section 148 is pivoted radially outward. The actuating section 144 is designed to be pushed radially outward by means of the sliding section 108 of the camshaft 64 in order to pivot the engagement section 148 radially inward about the axis of rotation 150.

If the engagement section 148 is pivoted radially outward and projects relative to the shaft, it can be brought into engagement with the engagement section 140 of the internal toothing 136 of the free gear 132 in one direction of rotation of the free gear 132 and thus connect the free gear to the shaft rotationally fixed in the direction of rotation.

The freewheel element 142 furthermore has a sliding section 152. The sliding section 152 serves to pivot the freewheel element 142 radially inward if the free gear is rotated relative to the shaft in a direction opposite to the direction of rotation and thus serves as a freewheel.

The actuating section 144 can have a groove which runs perpendicularly to the axis of rotation 150 or in the direction of rotation of the shaft in order to accommodate a spring element for preloading the freewheel element 142. This is explained in greater detail below.

The selector pawl 98 corresponds substantially to the freewheel element 142, and therefore attention is drawn below to the embodiments involving the freewheel element 142 in respect of identical elements.

A gear change is illustrated schematically in FIGS. 8A to 8F. For this purpose, radial sectional views through adjacent free gears 132 are shown during three phases of the gear change.

Figure 8:
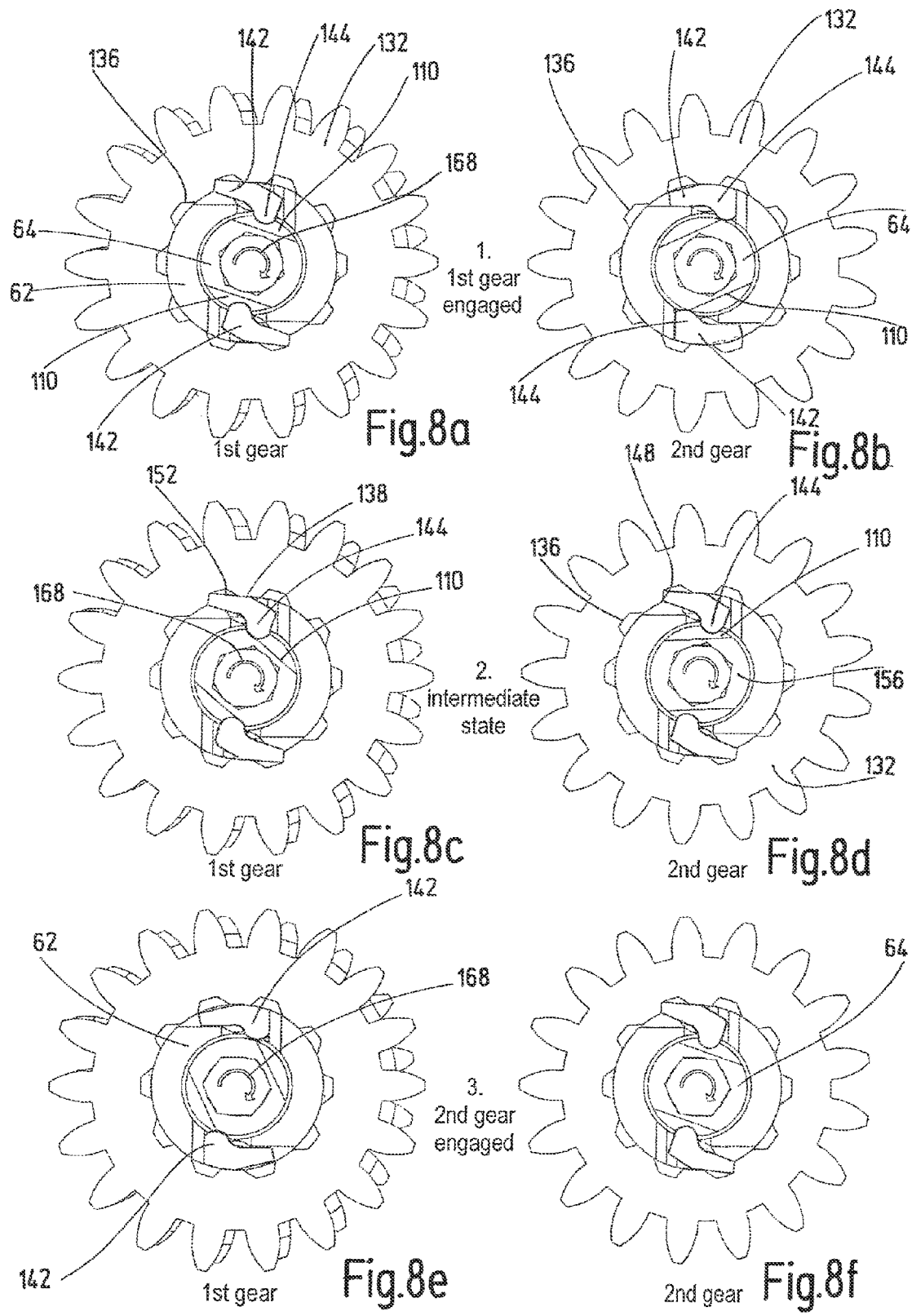
FIGS. 8A-F show schematic diagrams intended to illustrate shift operations with a rotatable camshaft.

FIG. 8A shows a first of the free gears 132, the internal toothing 136 of which is in engagement with the two associated freewheel elements 142. The camshaft 64 has been positioned in a rotational position relative to shaft 62 such that the cams 110 of the camshaft 64 is arranged in the region of the actuating sections 144 of the freewheel elements 142 and can thus pivot the freewheel element 142 outward.

The second of the free gears 132, which is assigned to the next higher gear stage, namely second gear, is shown in FIG. 8B. The freewheel elements 142 have been pivoted radially inward and are therefore not in engagement with the internal toothing 136 of the free gear 132. In this rotational position of the camshaft 64, the cams 110 which are assigned to second gear are not arranged under the actuating sections 144 of the freewheel elements 142, and the actuating sections 144 are therefore pushed outward.

If the camshaft 64 is turned, as indicated by an arrow 168, the cams 110 remain under the freewheel elements 142 which are assigned to the first of the free gears 132 and hence to first gear, as illustrated in FIG. 8C, with the result that the freewheel elements 142 of first gear remain pivoted outward.

In FIG. 8D, the second of the free gears 132 is illustrated in this rotational position of the camshaft 64 which is assigned to second gear. In this rotational position of the camshaft 64, the cams 110 which are assigned to second gear are arranged radially under the actuating sections 144 of the freewheel elements 142 of second gear, with the result that the actuating sections 144 pivot radially inward, and the engagement sections 148 can thus pivot radially outward. As a result, the engagement sections 148 can be brought into engagement with the internal toothing 136 of the free gear 132. The freewheel elements 142 are each assigned a spring (not shown), which preloads the corresponding freewheel element 142 in such a way that the actuating section 144 is pressed against the camshaft 64. As a result, the engagement section 148 pivots radially outward if one of the cams 110 is rotated under the selector pawl 142.

Since the higher gear stage has a lower transmission ratio, the freewheel pawls 142 of the higher gear engage in the internal toothing 136 and drive shaft 62 with a rotational speed which is greater than the rotational speed of the free gear 132 of the lower gear. In this so called intermediate state, the free gear 132 of the lower gear is therefore rotated in the opposite direction relative to shaft 62. As a result, the sliding section 138 of the free gear 132 presses against the sliding section 152 of the freewheel element 142, with the result that the freewheel element 142 is deflected inward, and the first of the free gears 132 slides on shaft 62. The free gear 132 of the lower gear, i.e. first gear, is in the intermediate state in the freewheel.

FIGS. 8E and 8F illustrate the state in which second gear is fully engaged. For this purpose, the camshaft 64 has been turned further in the direction of the arrow 168, with the result that the freewheel elements 142 of first gear have been pivoted inward by the camshaft 64, as shown in FIG. 8E. FIG. 8F shows that the freewheel elements 142 of second gear continue in engagement with the internal toothing 136 because the cams 110 of second gear are arranged under the actuating sections 144 of the freewheel elements 142.

Owing to the intermediate state, in which the freewheel elements 142 of two successive gears are pivoted out radially, selection under load is possible. An idling state is furthermore avoided.

During shifting to a low gear, the sliding section 138 of the internal toothing 136 of the lower gear first of all slides over the freewheel elements 142 in the intermediate state. Initially, the higher gear remains engaged. The freewheel elements 142 are only pivoted in and disengaged when the load transmitted to shaft 154 via the free gear 132 is reduced. In addition, the camshaft 64 must then be rotated further, pushing the actuating section 144 outward. The lower gear is then engaged immediately because this gear is already in the intermediate state or in the freewheeling state. An idling state is thereby avoided.

In FIGS. 8A to 8F, the camshaft 64 is shown with cams 110 situated exactly opposite. As an alternative, it is also conceivable for the cams 110 to be arranged relative to one another in such a way that only one of the selector pawls is brought into engagement with the internal toothing 136. This is achieved by not arranging the selector pawls 142 exactly opposite on shaft 64. This enables the angle of rotation of the free gear 132 before engagement of the actuating section 148 in the internal toothing 136 to be reduced. In an alternative embodiment, just one selector pawl 142 is assigned to a free gear and just one cam 110 is assigned to the associated actuating element.

Figure 9:
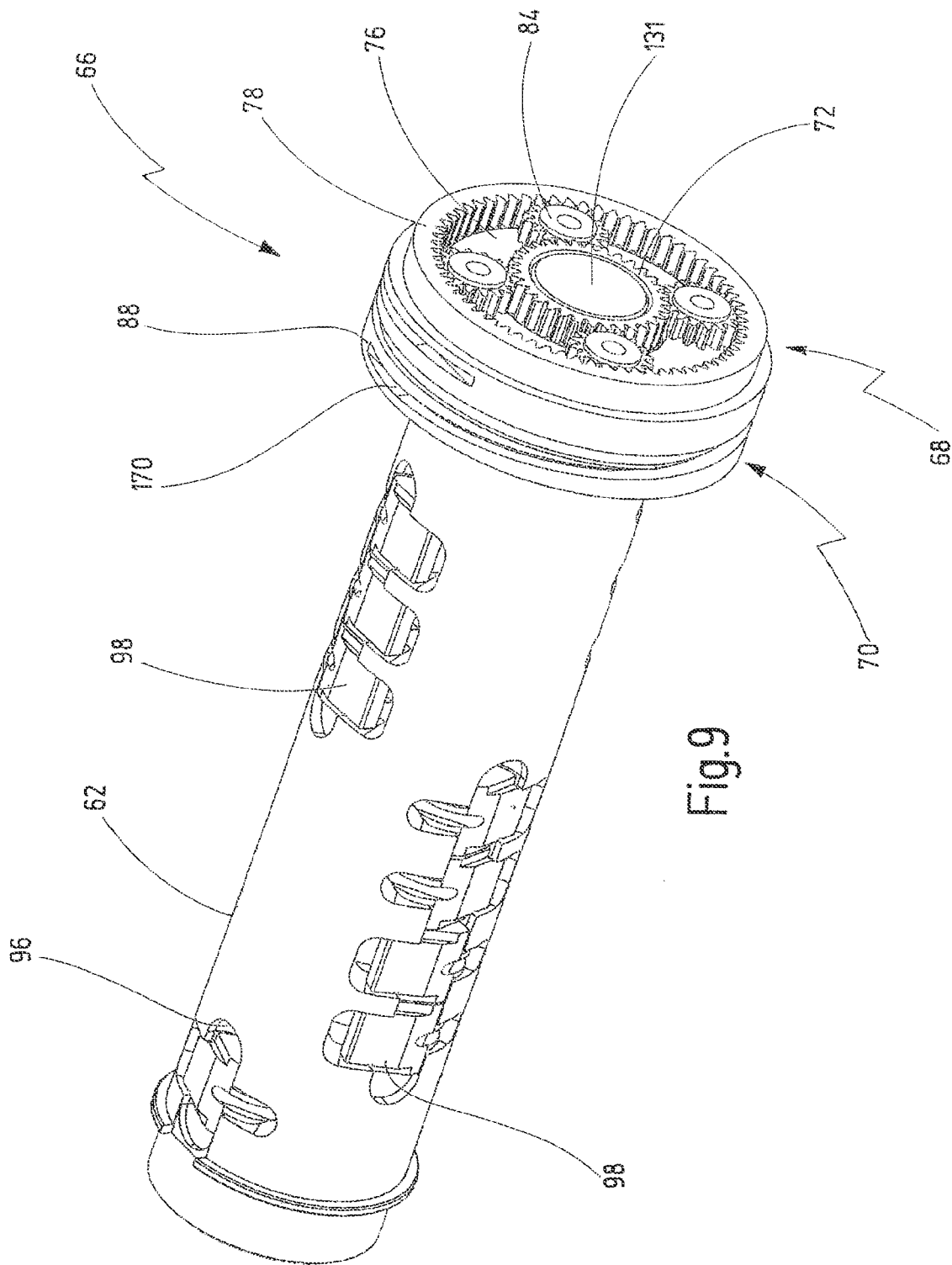
FIG. 9 shows a perspective view of a shaft with selector pawls, rotatable camshafts and a twin planetary gear unit.

FIG. 9 shows a perspective assembly drawing of the elements from FIG. 5. Elements which are the same are provided with the same reference numerals, and only the special features are explained here.

The speed superimposition transmission 66 is mounted at one axial end of shaft 62. Here, the first planetary gear unit 68 has four planet gears 84, which are mounted on the planet carrier 76. The planet gears 76 are in engagement both with the sun gear 72 and with the ring gear 78, with the result that the planet gears 84 run around the internal toothing of the ring gear 78 and at the same time revolve around the sun gear 72. The ring gear 86—not shown here—of the second planetary gear unit 70 is connected to the cable pulley 88. On the circumference, the cable pulley 88 has a groove 170, in which a Bowden cable (not shown) can be fixed or mounted. The groove 170 is in the form of a spiral or formed in a spiral in the cable pulley 88. Pulling the Bowden cable turns the ring gear 86 and rotates the camshaft 64 relative to shaft 62, as described above.

Figure 10:
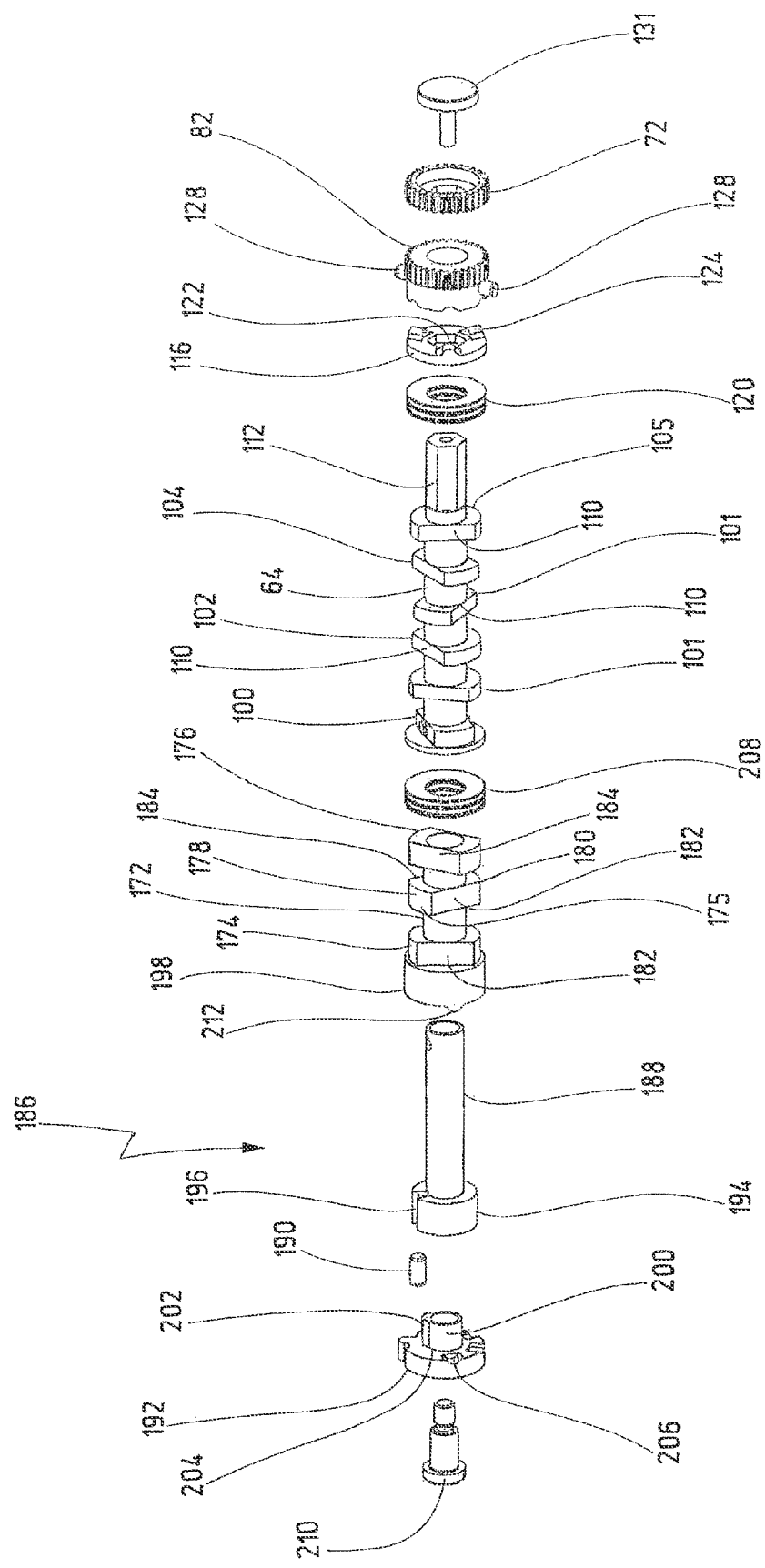
FIG. 10 shows an exploded view of two rotatable camshafts with a tappet clutch.

FIG. 10 shows an exploded view of two camshafts having a driver. Some of the elements illustrated in FIG. 10 correspond to the elements in FIG. 5, with elements which are the same being provided with the same reference numerals and only the differences being explained here.

A second camshaft 172 is arranged coaxially with camshaft 64 and is supported within shaft 62, which is not shown. The second camshaft 172 has three actuating elements 174, 175, 176. The actuating elements 174 to 176 each have two sliding sections 178, 180 and two cams 182, 184. The sliding sections 178, 180 are designed as round sections, coaxially with an axis of rotation of the second camshaft 172. The cams 182, 184 are designed as parallel surface areas on the actuating elements 174 to 176 and, when the actuating elements 174 to 176 are viewed axially, form the shape of a secant. The actuating elements 174, 175, 176 are each offset by 60° relative to one another.

A tappet 186 is arranged at one axial end of the second camshaft 172. The tappet 186 has a selector cylinder tappet 188, a tappet member or selector cylinder 190 and a cam plate 192. In the assembled state, the selector cylinder tappet is passed through the second camshaft 172 or mounted in the second camshaft 172 and is connected to the first camshaft 64 rotationally fixed. The selector cylinder tappet 188 has a tappet section 194 which is arranged at an opposite axial end of the selector cylinder tappet 188 from the first camshaft 64. The tappet section 194 is of cylindrical design, with a radial recess which forms a selector cylinder receptacle 196. In the assembled state, the selector cylinder 190 is accommodated in the selector cylinder receptacle 196. The selector cylinder 190 is mounted in the selector cylinder receptacle 196 in such a way that it can move radially. At one axial end, the camshaft 172 has a sleeve section 198, which surrounds the tappet section 194 circumferentially in the assembled state. The cam plate 192 has a cylindrical section, the outer circumferential surface of which forms a sliding section 200. The sliding section 200 has a cam 202, which is raised in a radial direction. In the assembled state, the sliding section 200 is surrounded circumferentially by the tappet section 194. In the assembled state, the selector cylinder 190 slides on the sliding section 200. The cam plate 192 furthermore has an indexing section 204 with a plurality of recesses 206 or grooves 206. The sleeve section 198 furthermore has at least one nose 212, which projects in an axial direction relative to the sleeve section 198. In the assembled state, the indexing section 204 is connected to shaft 62 rotationally fixed. Arranged between the first camshaft 64 and the second camshaft 172 is a spring element 208, which preloads the second camshaft 172 in an axial direction relative to the cam plate 192. In the assembled state, an end screw 210 is passed coaxially through the cam plate 192 and connected to the selector cylinder tappet 188.

The actuating elements 174 to 176 of the second camshaft 172 are used to actuate selector pawls 98 of the second transmission subsection 28 in order to connect at least one of the free gears 48 to 50 to shaft 62 for conjoint rotation. The camshaft 172 is mounted in a manner which allows rotation relative to shaft 62 in order to actuate different selector pawls 98 in different rotational positions. In this way, individual gear stages of the second transmission subsection 28 can be achieved. The actuating elements 174 to 176 have the sliding sections 178, 180 in order to pivot the selector pawls 98 radially inward, with the result that the corresponding free gear slides on shaft 62. The cams 182, 184 of the actuating elements 184 to 186 serve to pivot the selector pawls 98 radially outward and to connect the corresponding free gear to shaft 62 for conjoint rotation.

In order to rotate the second camshaft 172, the second camshaft 172 can be connected to the first camshaft 64 by means of the tappet 186. The selector cylinder driver 188 is mounted coaxially in the second camshaft 172 and is connected to the first camshaft 64 rotationally fixed. In order to connect the selector cylinder tappet 188 to the second camshaft 172 rotationally fixed, the selector cylinder receptacle 196, in which the selector cylinder 190 is mounted in a radially movable manner, is formed in the tappet section 194. The selector cylinder 190 slides on the sliding section 200 of the cam plate 192. By virtue of the fact that the cam plate 192 is connected to shaft 62 rotationally fixed, the tappet section 194 is rotated relative to the cam plate 192 during each selecting operation, i.e. during each rotary movement of the first camshaft 64. When the selector cylinder 190 slides over the cam 202, the selector cylinder 190 is moved outward in a radial direction in the selector cylinder receptacle 196 and engages in a recess (not shown) in the inner circumferential surface of the sleeve section 198, as a result of which the camshaft 172 is taken along in rotation relative to shaft 62. If the selector cylinder tappet 188 is turned further relative to the cam plate 192, the selector cylinder 190 slides over the cam 202 and is moved inward in a radial direction toward the sliding section 200. As a result, the selector cylinder 190 is moved out of engagement with the sleeve section 198 once the selector cylinder 190 has moved over the cam 202. Consequently, the tappet 186 has the effect that, after each rotation of the first camshaft 64 by 360°, the second camshaft 172 is rotated by a predefined angle, in this case 60°. For the gear unit 10, this means that, after the highest gear of the first transmission subsection 26, further rotation of the first camshaft 64 engages second gear in the second transmission subsection 28 and simultaneously engages first gear in the first transmission subsection 26. This means, in turn, that sixth gear in the gear unit 10 is followed by seventh gear. Thus, all 18 gears of the gear unit 10 can be selected in succession by rotating the cable pulley 88. This logical linking of the first camshaft 64 with the second camshaft 172 allows convenient selection of all the gears in succession with just one shift lever. Needless to say, the driver 186 can also be used in reverse, i.e. in the opposite direction, and in this way it is possible to downshift through all 18 gears by rotating the cable pulley 88.

The indexing section 204 with the recesses 206 is used to enable the nose 212 to engage in one of the recesses 206 and thus latch the second camshaft 172 in various rotational positions relative to shaft 62. In order to enable the nose 212 to slide out of the recesses 206, i.e. release the latch, flanks of the nose 212 and of the recesses 206 are beveled or rounded, thus allowing the nose 212 to slide out of the corresponding recess 206 when a relative torque is applied between shaft 62 and the camshaft 172. For this purpose, the camshaft 172 is mounted in an axially movable manner and is supported and axially preloaded relative to the first camshaft 64 by means of the spring element 208.

The actuating elements 174 to 176 each have two cams 182, 184. As a result, two selector pawls 98 can be assigned to each of the free gears 48 to 50 and can be actuated by the second camshaft 172. This has the advantage that higher torques can be accepted by the second transmission subsection 28. The actuating elements 174 to 176 are each offset by 60° relative to one another because they each have two cams 110 and hence the camshaft 172 is once again in a rotational position corresponding to the initial rotational position after a rotation by 180°.

Figure 11:
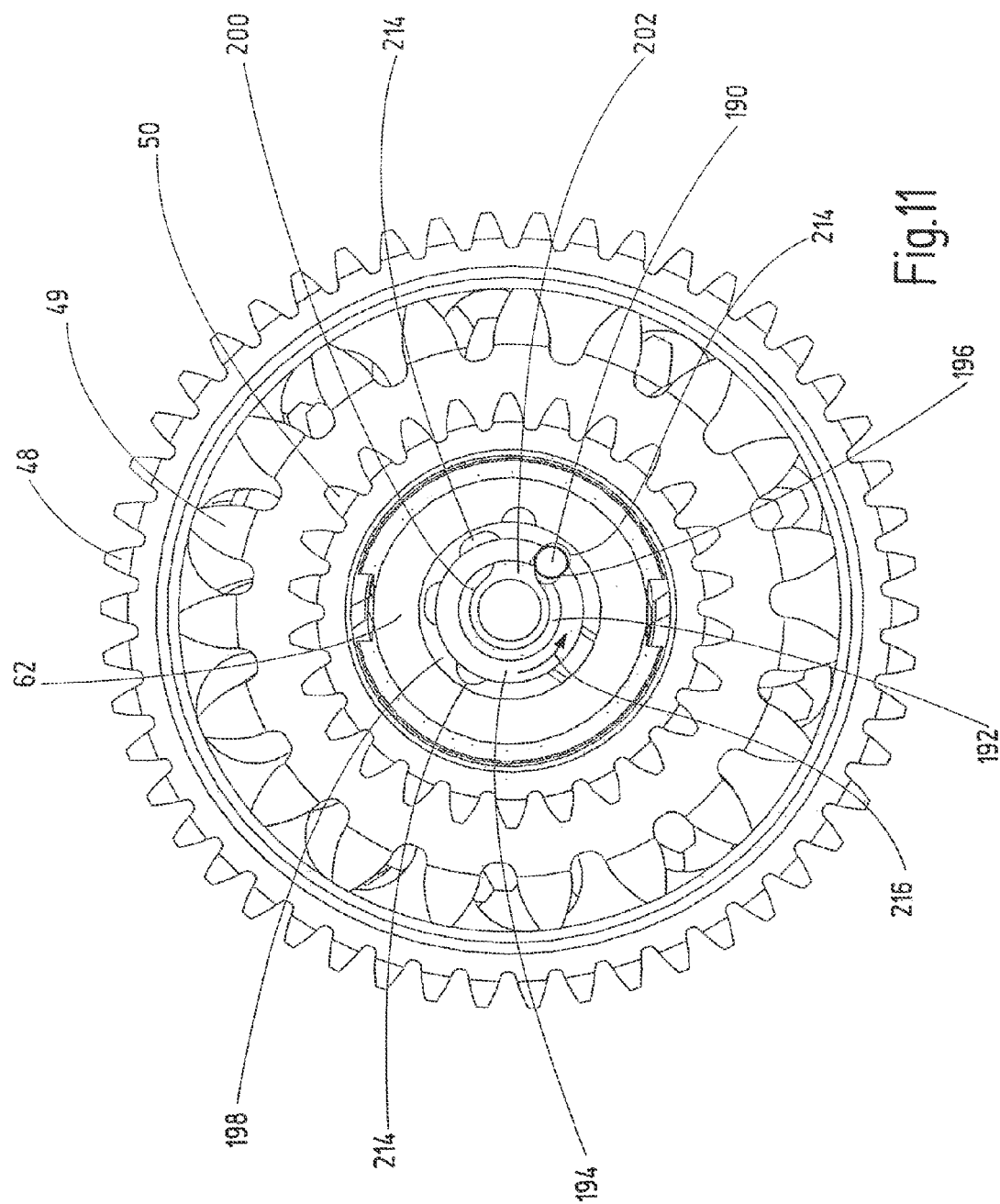
FIG. 11 shows a schematic sectional view of a shaft with free gears and a tappet viewed in an axial direction.

FIG. 11 shows a schematic representation of shaft 62, viewed in an axial direction, for the purpose of explaining the tappet 186. Elements which are the same are provided with the same reference numerals, and only the special features are explained here.

The sliding section 200 and the cam 202 of the cam plate 192 are arranged within the tappet section 194. The tappet section 194 is arranged within the sleeve section 198. On its inner circumferential surface, the sleeve section 198 has recesses 214. The sleeve section 198 is arranged coaxially within shaft 62. The selector cylinder 190 is accommodated in recess 196.

The tappet section 194 is turned relative to the cam plate 192, namely in the direction of an arrow 216. Owing to the fact that recess 196 slides over the cam 202, the selector cylinder 190 is pushed outward in a radial direction in recess 196 by the cam 202 and engages in the recess 214 in the sleeve section 198. The selector cylinder driver 188 is thereby connected to the second camshaft 172 for conjoint rotation and, as a result, the rotary motion of the first camshaft 64 is transmitted to the second camshaft 172. Once recess 196 has rotated past the cam, the selector cylinder 190 moves radially inward toward the sliding section 200. The selector cylinder 190 is thereby moved out of engagement with recess 214 and, as a result, the rotationally fixed connection between the selector cylinder tappet 188 and the second camshaft 172 is released. As a result, the second camshaft 172 is taken along in rotation by a certain angle of rotation during each complete revolution of the first camshaft 64. The angle of rotation here is determined by the size of the cam 202.

Figure 12:
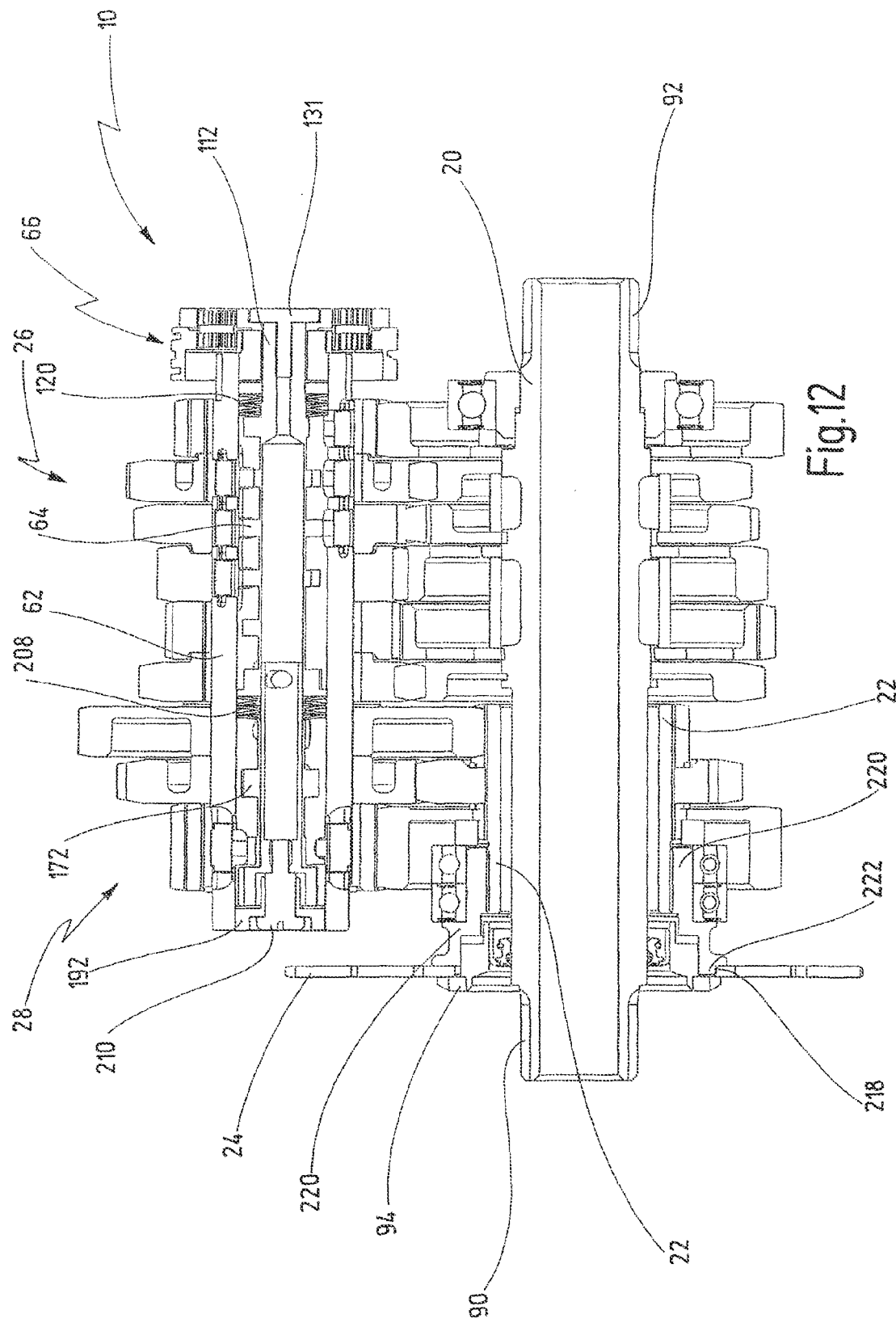
FIG. 12 shows a schematic sectional view of a gear unit having two rotatable camshafts and a twin planetary gear unit.

FIG. 12 shows a sectional view through the gear unit 10 along the input shaft 20 and shaft 62. Elements which are the same are designated by the same reference numerals, and only the special features are explained here. The chain wheel 24 is connected by means of the central screw 94 to the output shaft 22 for conjoint rotation. The chain wheel 24 is provided with internal toothing 218. A connection element 220 is connected to the output shaft 22 for conjoint rotation. The internal toothing 218 engages in a connection section 222 of the connection element 220, and a positive connection is thereby formed.

By virtue of the fact that the internal toothing 218 forms a positive connection to the connection section 222, the chain wheel 24 can be replaced or mounted on the output shaft 22 in a simple manner by placing it thereon and fixing it by means of the central screw 94.

Figure 13:
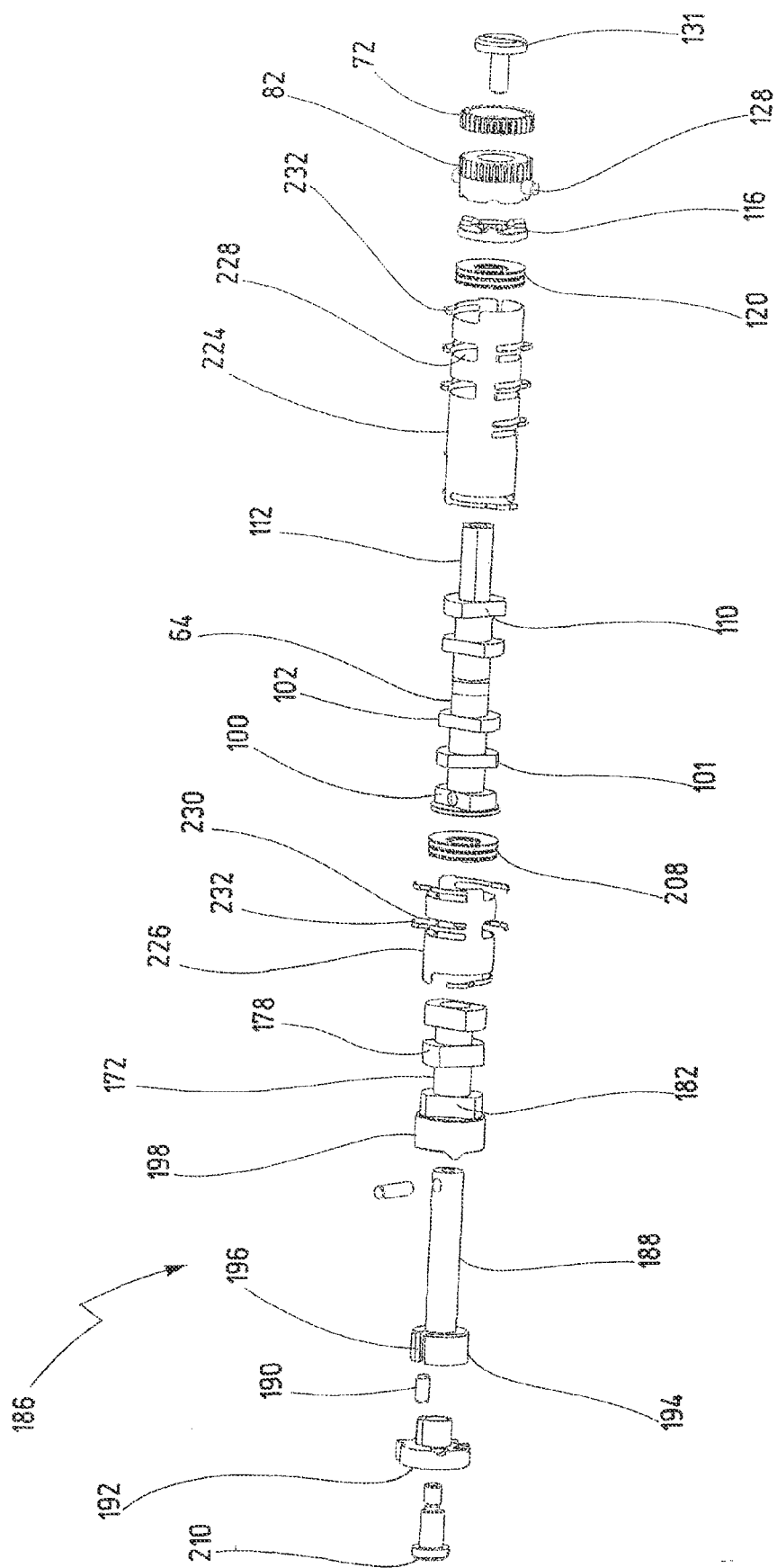
FIG. 13 shows an exploded view of two rotatable camshafts with two spring sleeves.

FIG. 13 is an exploded view of one embodiment of the gear unit shown in FIG. 10. Elements which are the same are designated by the same reference numerals, and only the differences are explained here.

In addition to the elements illustrated in FIG. 10, the gear unit shown in FIG. 13 has a first spring sleeve 224 and a second spring sleeve 226. The spring sleeves 224, 226 are of cylindrical design and each have a plurality of recesses 228, 230, which are formed in respective circumferential surfaces of the spring sleeves 224, 226. The recesses 228, 230 are of substantially U-shaped design, with two parallel slots in a circumferential direction and one slot in an axial direction, which connects the two parallel slots to one another. As a result, spring elements 232 are formed between the slots on the circumferential surface in each of the recesses 228, 230. The spring elements 232 are formed integrally with the respective spring sleeve 224, 226. The first spring sleeve 224 is assigned to the first camshaft 64. The second spring sleeve 226 is assigned to the second camshaft 172. In the assembled state of the gear unit 10, the first spring sleeve 224 surrounds the first camshaft 64 circumferentially and is simultaneously surrounded circumferentially by shaft 62. In the assembled state of the gear unit 10, spring sleeve 226 surrounds the second camshaft 172 circumferentially and is simultaneously surrounded circumferentially by shaft 62. Thus, the spring sleeves 224, 226 are arranged or mounted on the inner circumferential surface of shaft 62, coaxially with shaft 62. The spring elements 232 are formed in the respective circumferential surface of the spring sleeves 224, 226 in such a way that each of the spring elements 232 is assigned to one of the recesses 96 in shaft 62 or to a selector pawl 98. The spring sleeves 224, 226 are each connected to shaft 62 rotationally fixed.

The spring elements 232 serve to provide sprung support for the selector pawls 98, with the result that the selector pawls 98 project relative to shaft 62 without the imposition of a force by one of the camshafts 64, 172. This means that the spring force of the spring elements 232 causes the selector pawls 98 to pivot inward in the region of the cams 110 in such a way that the respective engagement section 148 projects radially outward relative to shaft 62. The spring elements 232 ensure that the engagement sections 148 of the selector pawls 98 pivot reliably outward. By virtue of the fact that the spring elements 232 are formed by the apertures 228, 230 in the respective circumferential surfaces of the spring sleeves 224, 226, low-cost production of the spring elements 232 and, at the same time, simple installation of the spring elements 232 is possible.

The interaction between the spring elements 232 and the selector pawls 98 is explained in greater detail below.

Figure 14:
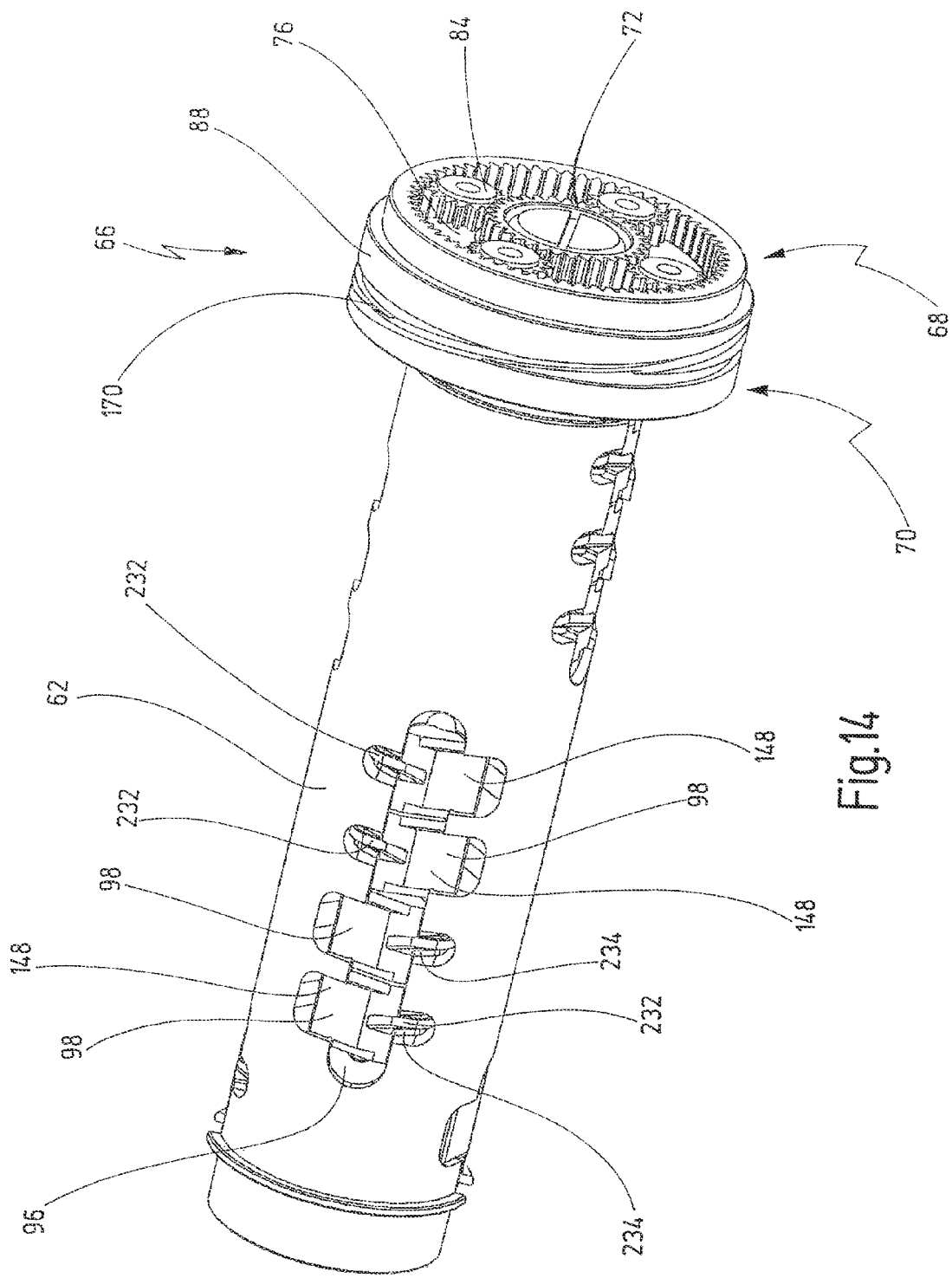
FIG. 14 shows a perspective view of a shaft with selector pawls and spring sleeves.

In FIG. 14, shaft 62 is shown in a perspective assembly drawing. The illustration in FIG. 14 corresponds substantially to the illustration in FIG. 9, wherein elements which are the same are designated by the same reference numerals, and only the differences are explained here.

The selector pawls 98 correspond substantially to the selector pawl 142 illustrated in FIG. 7, and therefore reference is made in this respect to FIG. 7.

The selector pawls 98 are provided with the spring elements 232, wherein the spring elements 232 are each accommodated in a groove 234 in the selector pawls 98. To this extent, the selector pawls 98 in FIG. 14 differ from the selector pawl 142 illustrated in FIG. 7. The grooves 234 are formed on a section of the selector pawls 98 which can be pivoted radially inward.

The spring elements 232 exert a force on the selector pawls 98 in such a way that the actuating section 144 (not shown here) is preloaded radially inward. As a result, the engagement section 148 of the selector pawl 98 pivots outward if the corresponding cam 110, 182 is facing the corresponding selector pawl 98. When the corresponding camshaft 64, 172 is rotated further, so that the corresponding sliding section 108, 178 faces the selector pawl 98, the actuating section 144 is pushed radially outward, the engagement section 148 is pivoted radially inward, and the spring element 232 is subjected to a load.

Figure 15:
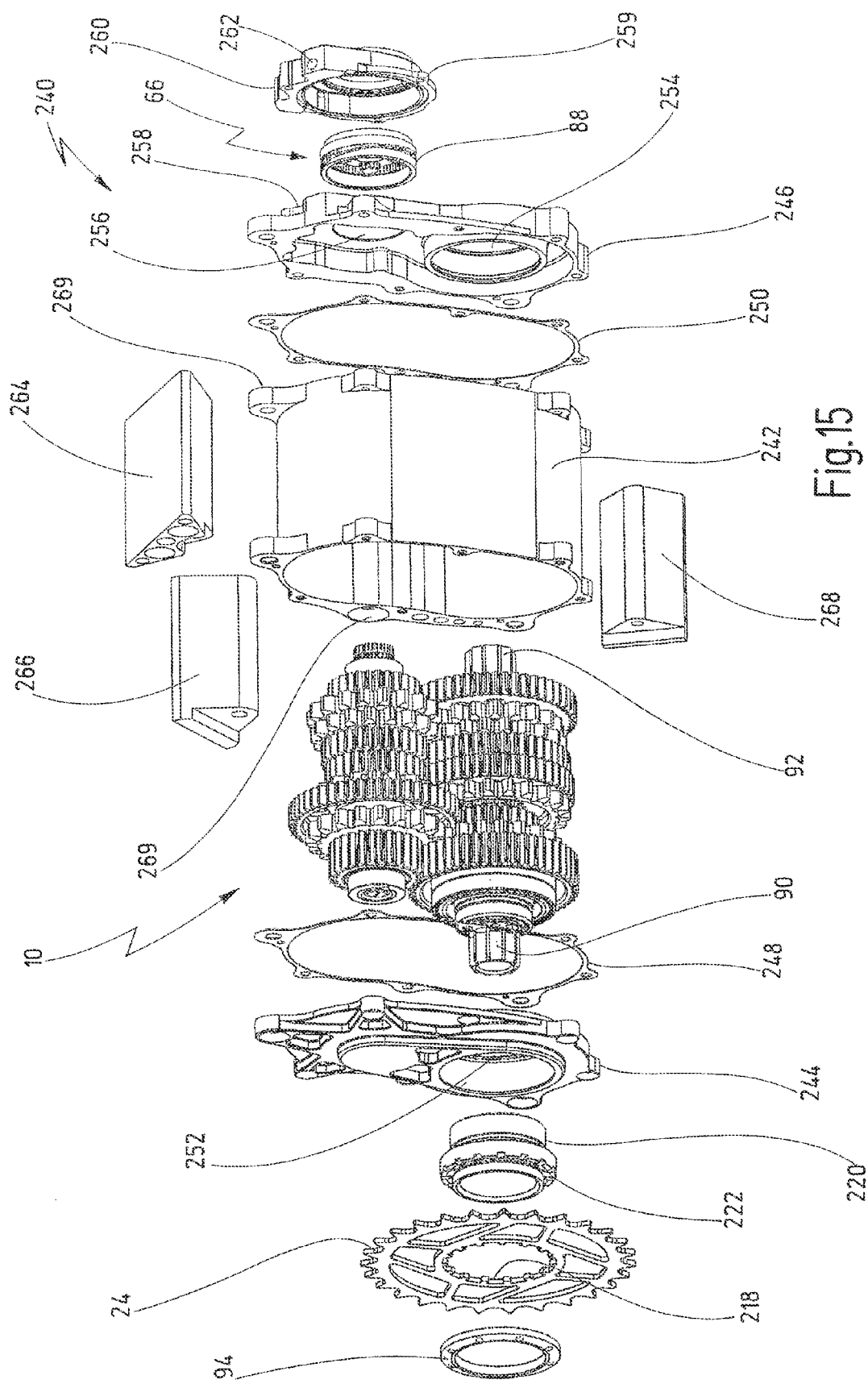
FIG. 15 shows an exploded view of a gear case with a multi-speed gear unit.

FIG. 15 shows an exploded view of a gear case for the gear unit 10. In FIG. 15, a gear case is designated in general by 240.

The gear case 240 has a case shell 242, which surrounds the gear unit 10 substantially circumferentially in the assembled state. The gear case 240 has a first case cover 244 and a second case cover 246, which close the case shell 242 at the axial ends thereof and accordingly form end faces of the gear case 240. Respective case gaskets 248, 250 are arranged between the case covers 244, 246 and the case shell 242. The case covers 244, 246 each have an opening 252, 254 to enable the respective connecting sections 90, 92 of the input shaft 22 to be passed through to the outside. The connection element 220, which connects the chain wheel 24 to the output shaft 22 for conjoint rotation, is furthermore passed through the opening 252. The connection element 220 has the connection section 222, which is designed as toothing. The chain wheel 24 has the internal toothing 218, which engages in the toothing of the connection section 222 and connects the chain wheel 24 to the connection element 220 rotationally fixed. The chain wheel 24 is fixed on the connection element 220 by means of the central screw 44. The case cover 246 furthermore has an opening 256, through which shaft 62 is passed to the outside. The speed superimposition mechanism 66 is mounted at the opening 256, namely an outer side 258 of the case cover 246. The speed superimposition mechanism 66 is connected to shaft 62, which is passed through the opening 256. A mechanism cover 259, which surrounds the speed superimposition transmission 66 circumferentially and at an end facing away from the case cover 246, is fixed on the outer side 258 of the case cover 246. The mechanism cover 259 has two penetrations 260, 262, through which Bowden cables can be passed and accommodated in the groove 170 of the cable pulley 88 in order to actuate or rotate the cable pulley 88.

Support elements 264, 266, 268 are assigned to the gear case 240. The support elements 264, 266, 268 serve to connect the gear case 240 firmly to the frame 12 and to support the gear case 240 on the frame 12. The support elements 264, 266, 268 are preferably connected to the gear case 240 by means of vibration-damping mounts 269 made, for example, of rubber in order to form a vibration decoupling means between the gear case 240 and the frame 12. The mounts 269 can thus prevent transmission noise from being transmitted without damping to the resonant elements of the bicycle frame 12, thus acoustically decoupling the gear case 240 from the frame 12.

Figure 16:
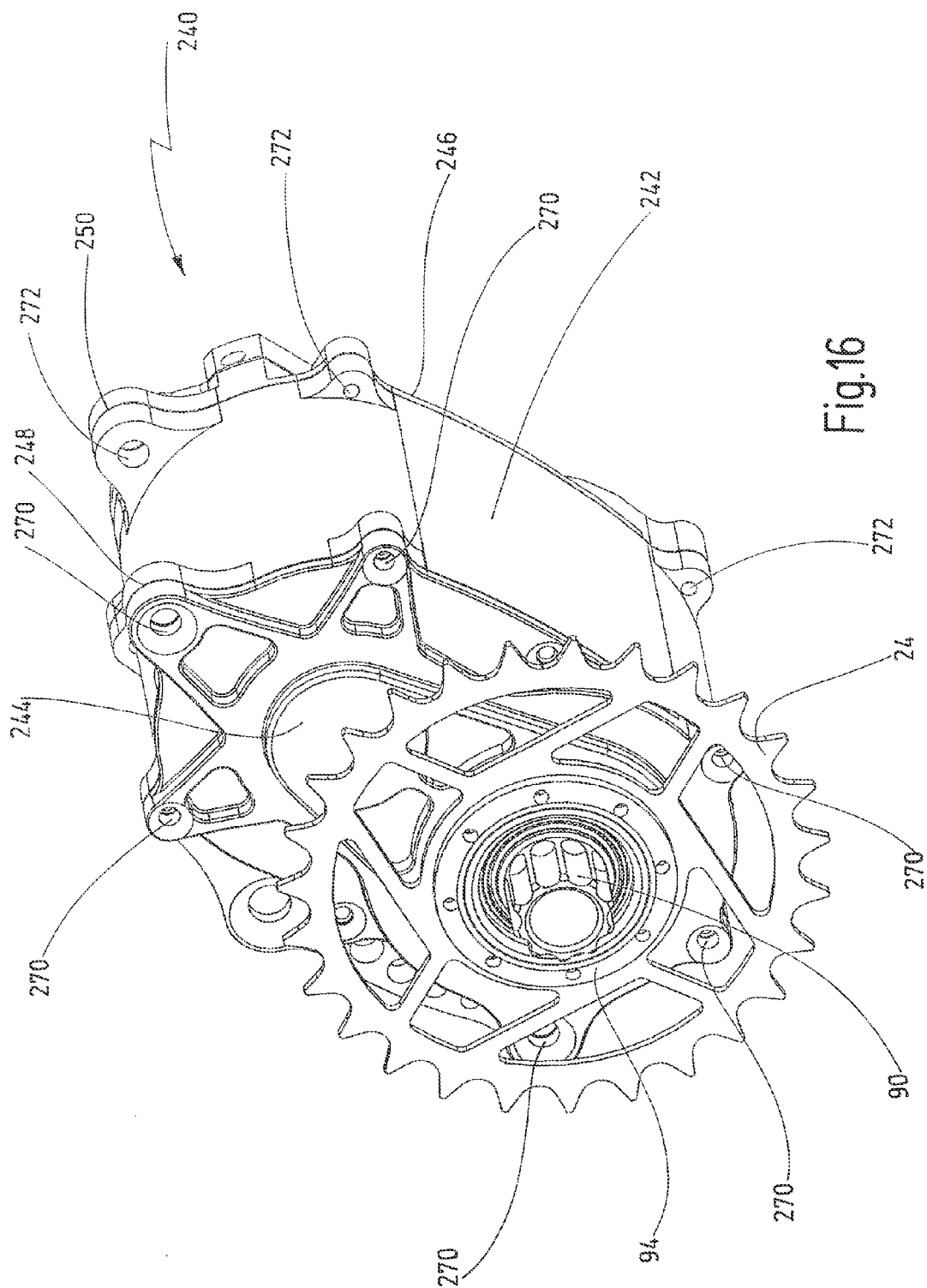
FIG. 16 shows a perspective view of a gear case for a multi-speed transmission.

A perspective assembly drawing of the gear case 240 is illustrated in FIG. 16. Elements which are the same are provided with the same reference numerals, and only the special features are explained here.

The case covers 244, 246 have a plurality of screw holes 270. The case shell 242 has a corresponding plurality of screw holes 272. By means of the screw holes 270, 272, the case covers 244, 246 are screwed to the case shell 242. Moreover, the screw holes 270, 272 serve to connect the gear case 240 to the frame 12 and to the support elements 264, 266, 268. The screw holes 270, 272 can furthermore simultaneously serve for mounting rear wheel suspension systems in the case of bicycles with full suspension.

Figure 17:
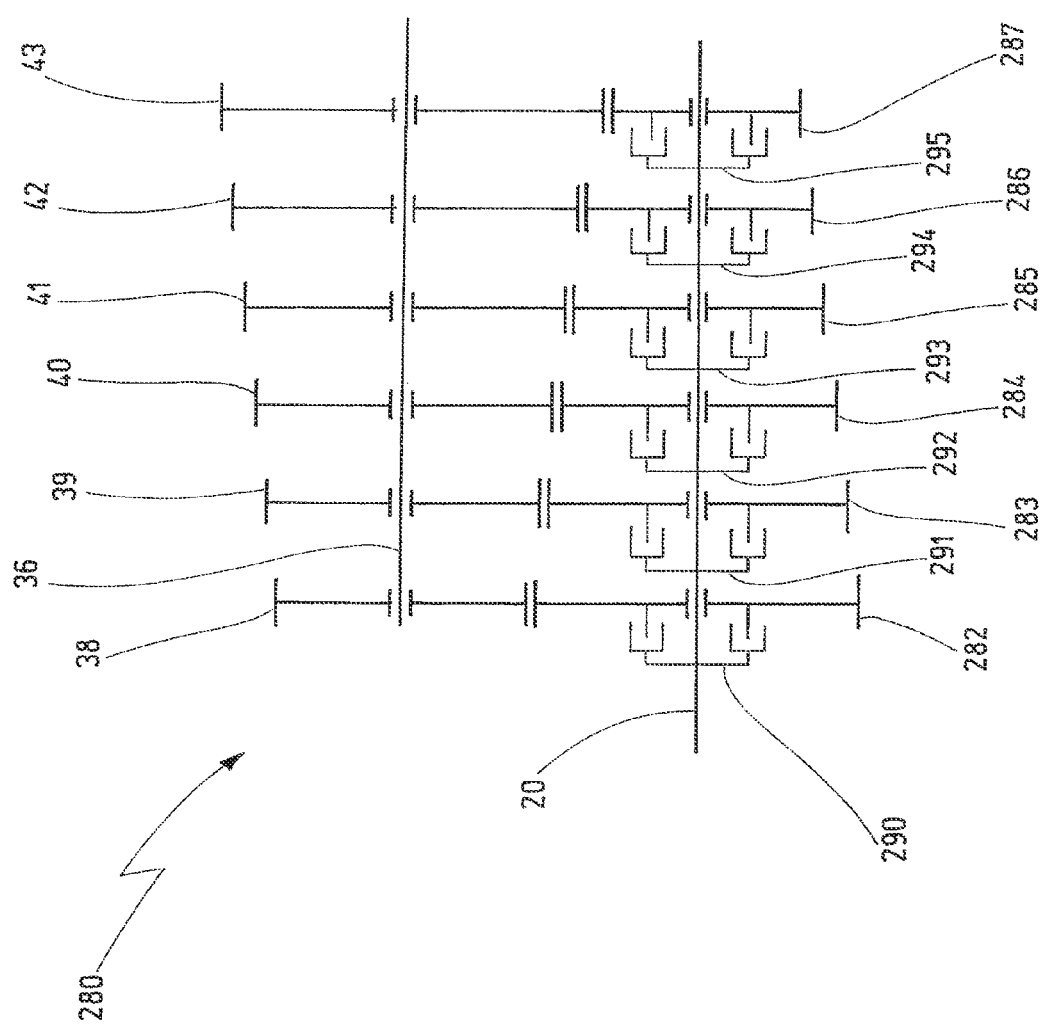
FIG. 17 shows a shift diagram for a multi-speed transmission comprising gearwheels mounted with nonpositive engagement.

In FIG. 17, a gear unit with nonpositively mounted gearwheels is shown and designated in general by 280. The gear unit 280 corresponds substantially to transmission subsection 26 in FIG. 2. Elements which are the same are designated by the same reference numerals, and only the differences are explained here.

Gearwheels 282, 283, 284, 285, 286, 287 are mounted on the input shaft 20. The gearwheels 282 to 287 are designed as free gears and are each in mesh with the corresponding driven gears 38 to 43, which are mounted on the countershaft 36. The free gears 282 to 287 are each connected to the input shaft 20 by means of a clutch 290, 291, 292, 293, 294, 295. The clutches 290 to 295 preferably connect the free gears 282 to 287 to the input shaft 20 nonpositively. In a special embodiment, the clutches 290 to 295 are designed as friction clutches and connect the free gears 282 to 287 frictionally to the input shaft 20. As an alternative, one clutch 290-295 or two clutches 290-295 can be provided for all the free gears 282-287.

The clutches 290 to 295 are designed in such a way that the free gears 282 to 287 can be connected to the input shaft 20 for conjoint rotation up to a predefined torque and slide on the input shaft 20 above the predefined torque. This enables the torque introduced into the gear unit 280 via the input shaft 20 to be limited and hence enables the gear unit 280 to be designed for a corresponding maximum load. In a special embodiment, the torque which can be transmitted via the clutches 290 to 295 is adjustable. In a special embodiment, the predefined torque can furthermore be set to a different level or individually for each of the clutches 290 to 295.

Needless to say, the clutches 290 to 295 in FIG. 17 can be combined with all the gear units of the present invention, in particular with the gear unit 10 in FIG. 2.

What is claimed is:

1. A gear unit for a vehicle that is driven by muscle force, having a first shaft, on which a plurality of first gearwheels is mounted, and a second shaft, on which a plurality of second gearwheels is mounted, wherein each of the second gearwheels is meshed with a respective one of the first gearwheels, wherein the first gearwheels are formed as free gears which can be connected rotationally fixed to the first shaft by means of selecting devices, wherein each of the second gearwheels is connected nonpositively to the second shaft by means of a respective torque limiting clutch, wherein each of the torque limiting clutches connects each of its associated one of the second gearwheels to the second shaft up to a predetermined torque, and wherein the predetermined torque is adjustable individually for each of the second gearwheels.

2. The gear unit as claimed in claim 1, wherein each second gearwheel is adapted to slide on the second shaft above the predetermined torque.

3. The gear unit as claimed in claim 1, wherein each torque limiting clutch is designed as a friction clutch.

4. The shifting device as claimed in claim 1, wherein the selecting devices are designed as selectable freewheels.

5. The shifting device as claimed in claim 1, wherein the selecting devices have selector pawls, which can be brought into engagement with internal toothing of the free gears.

6. A gear unit for a vehicle that is driven by muscle force, having a first shaft, on which a plurality of first gearwheels is mounted, and a second shaft, on which a plurality of second gearwheels is mounted, wherein each of the second gearwheels is in engagement with a corresponding one of the first gearwheels and meshed with the corresponding one of the first gearwheels, wherein each of the second gearwheels can be connected nonpositively to the second shaft by means of a torque limiting clutch, wherein each of the torque limiting clutches connects each if its associated one of the second gearwheels to the second shaft up to a predetermined torque, and wherein the first gearwheels are formed as free gears which can be connected rotationally fixed to the first shaft by means of selecting devices.

7. The gear unit as claimed in claim 6, wherein each second gearwheel is adapted to slide on the second shaft above a predetermined torque.

8. The gear unit as claimed in claim 7, wherein the predetermined torque is adjustable.

9. The gear unit as claimed in 6, wherein the second gearwheels are formed as free gears which can be connected rotationally fixed to the second shaft by means of torque limiting clutches.

10. The shifting device as claimed in claim 6, wherein the selecting devices are designed as selectable freewheels.

\* \* \* \* \*